United States Patent
Sargent

(10) Patent No.: US 10,386,556 B2
(45) Date of Patent: *Aug. 20, 2019

(54) BIREFRINGENT RM LENS

(71) Applicant: Merck Patent GmbH, Darmstadt (DE)

(72) Inventor: Joseph Sargent, Southampton (GB)

(73) Assignee: Merck Patent GmbH, Darmstadt (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/650,730

(22) PCT Filed: Dec. 4, 2013

(86) PCT No.: PCT/EP2013/003650
§ 371 (c)(1),
(2) Date: Jun. 9, 2015

(87) PCT Pub. No.: WO2014/090379
PCT Pub. Date: Jun. 19, 2014

(65) Prior Publication Data
US 2015/0369982 A1 Dec. 24, 2015

(30) Foreign Application Priority Data
Dec. 14, 2012 (EP) .................... 12008331

(51) Int. Cl.
G02B 5/30 (2006.01)
C09K 19/20 (2006.01)
C09K 19/32 (2006.01)
B29D 11/00 (2006.01)
C09K 19/38 (2006.01)
C09K 19/04 (2006.01)
C09K 19/18 (2006.01)
B29K 67/00 (2006.01)

(52) U.S. Cl.
CPC ...... *G02B 5/3016* (2013.01); *B29D 11/00644* (2013.01); *C09K 19/2014* (2013.01); *C09K 19/322* (2013.01); *C09K 19/3809* (2013.01); *B29K 2067/00* (2013.01); *B29K 2995/0032* (2013.01); *C09K 2019/0448* (2013.01); *C09K 2019/181* (2013.01); *C09K 2019/188* (2013.01)

(58) Field of Classification Search
CPC ........ B29D 11/0644; B29K 2995/0032; G02B 5/3016; C09K 19/2014; C09K 19/3809; C09K 2019/0448; C09K 2019/181; C09K 2019/188
See application file for complete search history.

(56) References Cited

U.S. PATENT DOCUMENTS

| 7,931,825 B2 | 4/2011 | Irisawa | |
| 9,644,145 B2* | 5/2017 | Sargent | C09K 19/3814 |
| 2006/0043980 A1 | 3/2006 | Verstegen | |
| 2006/0098285 A1* | 5/2006 | Woodgate | G02B 27/2214 359/487.02 |
| 2011/0178200 A1* | 7/2011 | Parri | C09K 19/18 522/173 |
| 2014/0085709 A1 | 3/2014 | Ramon-Gimenez et al. | |
| 2015/0322345 A1* | 11/2015 | Sargent | G02B 1/08 349/182 |

FOREIGN PATENT DOCUMENTS

| GB | 2425774 A | 11/2006 |
| JP | 2006-512712 A | 4/2006 |
| JP | 2006-520919 A | 9/2006 |
| JP | 2008-195762 A | 8/2008 |
| JP | 2011-510915 A | 4/2011 |
| JP | 2012137616 A | 7/2012 |
| WO | 2012152409 A1 | 11/2012 |

OTHER PUBLICATIONS

English translation of JP 2012-137616 provided by Japanese Patent Office.*
International Search Report from PCT Application No. PCT/EP2013/003650 dated Apr. 16, 2014.
Office Action in corresponding Japan Application No. 2015-546889 dated Jun. 21, 2018. (3 pages).
Office Action in corresponding Japan Application No. 2015-546889 dispatched Mar. 18, 2019. (1 page).

* cited by examiner

Primary Examiner — Chanceity N Robinson
(74) Attorney, Agent, or Firm — Millen White Zelano & Branigan

(57) ABSTRACT

The invention relates to a RM lens obtainable from a polymerizable liquid crystalline medium comprising,
   a polymerizable liquid crystalline component A comprising one or more polymerizable mesogenic compounds, and
   at most 12% by weight of the total medium of a non-mesogenic component B.
Moreover, the invention relates to the use of such birefringent RM lenses in electro optical devices, such as liquid crystal displays (LCDs) or other optical or electrooptical devices, for decorative or security applications.

15 Claims, No Drawings

BIREFRINGENT RM LENS

FIELD OF INVENTION

The invention relates to a RM lens obtainable from a polymerizable liquid crystalline medium comprising,
  a polymerizable liquid crystalline component A comprising one or more polymerizable mesogenic compounds, and
  at most 12% by weight of the total medium of a non-mesogenic component B.

Moreover, the invention relates to the use of such birefringent RM lenses in electro optical devices, such as liquid crystal displays (LCDs) or other optical or electrooptical devices, for decorative or security applications.

BACKGROUND AND PRIOR ART

Polymerizable liquid crystals known as reactive mesogens (RM's) are widely known for their applications in viewing angle compensation films and thin film retarders in liquid crystal display (LCD) applications.

Recently such RMs have been suggested for the use in a patterned retarder in commercially available 3D LCD displays. In these applications, the birefringent nature of the RM is used to alternate the polarization of light emitted from the front of the LCD.

For example in US2009073559 (A1) or WO2011078989 A1, it has also been reported that glass free autostereoscopic displays can be realized by combining an active LC panel as a polarization switch and a polarization sensitive lens made on the front of LCD's.

Such devices comprise an LCD panel for example of the active matrix type that acts as a spatial light modulator to produce the display image. The display panel has an orthogonal array of display pixels arranged in rows and columns. In practice, the display panel comprises about one thousand rows and several thousand columns of display pixels.

The structure of the liquid crystal display panel is entirely conventional. In particular, the panel comprises a pair of spaced transparent glass substrates, between which for example an aligned twisted nematic or another liquid crystal medium is provided. The substrates carry patterns of transparent indium tin oxide (ITO) electrodes on their facing surfaces. Polarizing layers are also provided on the outer surfaces of the substrates.

Each display pixel comprises opposing electrodes on the substrates, with the intervening liquid crystal medium there between. The shape and layout of the display pixels are determined by the shape and layout of the electrodes. The display pixels are regularly spaced from one another by gaps. Each display pixel is associated with a switching element, such as a thin film transistor (TFT) or thin film diode (TFD). The display pixels are operated to produce the display image by providing addressing signals to the switching elements, and those skilled in the art will know suitable addressing schemes.

The display panel is illuminated by a light source comprising, in this case, a planar backlight extending over the area of the display pixel array. Light from the light source is directed through the display panel, with the individual display pixels being driven to modulate the light and produce the display image.

The display device of prior art comprises a lenticular sheet, arranged over the front side of the display panel, which performs a view forming function. The lenticular sheet comprises a row of lens elements extending parallel to one another. The lens elements are in a form of plano-convex lenses, and they act as a light output directing means to provide different images, or views, from the display panel to the eyes of a user positioned in front of the display device.

In this connection, US 2007/109400 A1 discloses a birefringent lens structure comprising a birefringent lens array capable of directing light of a given polarization into a directional distribution, the birefringent lens comprises a solid birefringent material and an isotropic material having an interface having a refractive structure. A switchable liquid crystal layer capable of rotating the polarization of light passing there through is arranged adjacent the first birefringent material. The interface between the birefringent material and the liquid crystal layer has an alignment microstructure providing alignment of the birefringent material and the liquid crystal layer. A pair of electrodes for applying an electric field to switch the liquid crystal is arranged with both the lens array and the switchable liquid crystal layer there between and a conductive material is incorporated in the lens array to reduce the voltage drop across the lens array. To reduce reflection, the interface between the birefringent material and the isotropic material has an interface having alignment microstructure providing alignment of the birefringent material, and the refractive index of the isotropic material is substantially equal to the extraordinary refractive index of the birefringent material.

JP2012-137616 A1 discloses a birefringent lens material for a stereoscopic image display which contains a reactive mesogenic compound having at least one or more polymerizable functional group, and a non-liquid crystal compound having at least one or more polymerizable functional group, and a manufacturing method of a birefringent lens for a stereoscopic image display using the birefringent lens material for the stereoscopic image display.

However, the use of non-mesogenic compounds or non-liquid crystalline materials in the lens material leads amongst other disadvantageously changes in the optical characteristics, to a drop of the birefringence.

If the birefringence of a suitable RM mixture is increased, the higher birefringence allows a higher radius of curvature (thinner lens) to be used for a given focal length. This phenomenon is well known to the skilled person and for example described in Hecht, E. (2002) Optics, 4th edn., "Geometrical optics" Chapter 5, page 158 et seqq.

In fact, modern applications require suitable high values for the birefringence in order to reduce the lens thickness and therefore the amount of materials and connected costs required to make such a lens. Moreover, the mixtures and/or the resulting lenses have to fulfil beside suitable values for the birefringence a number of other requirements, which are amongst others,
  a good room temperature stability against crystallization before polymerization,
  an homogeneous planar alignment throughout the whole lens,
  high clearing points,
  suitable low yellowness index
  a good stability against thermal stress, e.g. heat or cold,
  a good stability against UV-light,
  a good durability in an environment where it is externally exposed,
  a good transmission for VIS-light, and
  the method of its production has to be cost efficient and suitable for a mass production process.

In view of the prior art and the above-mentioned requirements on such materials, there is a considerable demand for new or alternative materials, which preferably do not show the drawbacks of the RM materials or mixtures of prior art or even if do so, to a less extend.

Surprisingly, the inventors have found that a birefringent RM lens as described and claimed hereinafter represents an excellent alternative to known birefringent RM lenses, which preferably improves one or more of the above-mentioned requirements or even more preferably fulfils all above-mentioned requirements at the same time.

SUMMARY OF THE INVENTION

The invention relates to a RM lens obtainable from a polymerizable liquid crystalline medium comprising, preferably consisting of,
  a polymerizable liquid crystalline component A comprising one or more polymerizable mesogenic compounds, and
  at most 12% by weight of the total medium of a non-mesogenic component B.

The invention further relates to a method of production of a birefringent RM lens as described above and below.

The invention further relates to the use of a birefringent RM lens as described above and below in liquid crystal displays (LCDs) or other optical or electrooptical devices.

The invention further relates to an electrooptical device, such as an LCD, comprising at least one birefringent RM lens as described above and below.

Terms and Definitions

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerization purification processes, are typically mixed or co-mingled with the polymer such that they generally remain with the polymer when it is transferred between vessels or between solvents or dispersion media.

The term "polymerization" means the chemical process to form a polymer by bonding together multiple polymerizable groups or polymer precursors (polymerizable compounds) containing such polymerizable groups.

The terms "film" and "layer" include rigid or flexible, self-supporting or freestanding films with mechanical stability, as well as coatings or layers on a supporting substrate or between two substrates.

The term "liquid crystal (LC)" relates to materials having liquid crystalline mesophases in some temperature ranges (thermotropic LCs) or in some concentration ranges in solutions (lyotropic LCs). They obligatorily contain mesogenic compounds.

The terms "mesogenic compound" and "liquid crystal compound" mean a compound comprising one or more calamitic (rod- or board/lath-shaped) or discotic (disk-shaped) mesogenic groups. The term "mesogenic group" means a group with the ability to induce liquid crystalline phase (or mesophase) behaviour.

The compounds comprising mesogenic groups do not necessarily have to exhibit a liquid-crystalline mesophase themselves. It is also possible that they show liquid-crystalline mesophases only in mixtures with other compounds, or when the mesogenic compounds or materials, or the mixtures thereof, are polymerized. This includes low-molecular-weight non-reactive liquid-crystalline compounds, reactive or polymerizable liquid-crystalline compounds, and liquid-crystalline polymers.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerizable groups.

The term "reactive mesogen" means a polymerizable mesogenic or liquid crystal compound, preferably a monomeric compound. These compounds can be used as pure compounds or as mixtures of reactive mesogens with other compounds functioning as photoinitiators, inhibitors, surfactants, stabilizers, chain transfer agents, non-polymerizable compounds, etc.

Polymerizable compounds with one polymerizable group are also referred to as "monoreactive" compounds, compounds with two polymerizable groups as "direactive" compounds, and compounds with more than two polymerizable groups as "multireactive" compounds. Compounds without a polymerizable group are also referred to as "non-reactive or non-polymerizable" compounds.

A "photo initiator" dissociates when exposed to the correct wavelength and the formed radicals will initiate polymerization of monomers.

Visible light is electromagnetic radiation that has wavelength in a range from about 400 nm to about 800 nm. Ultraviolet (UV) light is electromagnetic radiation with a wavelength in a range from about 200 nm to 400 nm.

The Irradiance ($E_e$) or radiation power is defined as the power of electromagnetic radiation (dθ) per unit area (dA) incident on a surface:

$$E_e = d\theta/dA.$$

The radiant exposure or radiation dose ($H_e$), is as the irradiance or radiation power ($E_e$) per time (t):

$$H_e = E_e \cdot t.$$

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

The term "clearing point" means the temperature at which the transition between the mesophase with the highest temperature range and the isotropic phase occurs.

The term "alignment" or "orientation" relates to alignment (orientational ordering) of anisotropic units of material such as small molecules or fragments of big molecules in a common direction named "alignment direction". In an aligned layer of liquid-crystalline or RM material the liquid-crystalline director coincides with the alignment direction so that the alignment direction corresponds to the direction of the anisotropy axis of the material.

The terms "uniform orientation" or "uniform alignment" of an liquid-crystalline or RM material, for example in a layer of the material, mean that the long molecular axes (in case of calamitic compounds) or the short molecular axes (in case of discotic compounds) of the liquid-crystalline or RM molecules are oriented substantially in the same direction. In other words, the lines of liquid-crystalline director are parallel.

Throughout this application, the alignment of liquid-crystalline or RM layers, unless stated otherwise, is uniform alignment.

The term "planar orientation/alignment", for example in a layer of an liquid-crystalline or RM material, means that the long molecular axes (in case of calamitic compounds) or the short molecular axes (in case of discotic compounds) of the liquid-crystalline or RM molecules are oriented substantially parallel to the plane of the layer.

The term "tilted orientation/alignment", for example in a layer of an liquid-crystalline or RM material, means that the long molecular axes (in case of calamitic compounds) or the short molecular axes (in case of discotic compounds) of the liquid-crystalline or RM molecules are oriented at an angle θ ("tilt angle") between 0 and 90° relative to the plane of the layer.

In case of doubt the definitions as given in C. Tschierske, G. PelzI and S. Diele, Angew. Chem. 2004, 116, 6340-6368 shall apply.

DETAILED DESCRIPTION

The polymerizable liquid-crystalline component A comprises one or more polymerizable mesogenic compounds, preferably of a mixture of two or more polymerizable mesogenic compounds, for example 2 to 30 polymerizable mesogenic compounds.

The polymerizable mesogenic compounds are preferably selected from calamitic or discotic compounds demonstrating thermotropic or lyotropic liquid crystallinity, very preferably calamitic compounds, or mixtures of one or more types of these compounds having liquid-crystalline mesophases in a certain temperature range. These materials typically have good optical properties, like reduced chromaticity, and can be easily and quickly aligned into the desired orientation. The liquid crystals can be small molecules (i.e. monomeric compounds) or liquid-crystalline oligomers.

In a preferred embodiment, the polymerizable liquid crystalline component A comprises one or more polymerizable mono-, di- or multireactive mesogenic compounds.

Preferably, one or more of the polymerizable mono-, di- or multireactive mesogenic compounds of component A are selected from compounds of formula I,

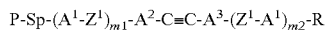

P-Sp-(A$^1$-Z$^1$)$_{m1}$-A$^2$-C≡C-A$^3$-(Z$^1$-A$^1$)$_{m2}$-R  I wherein

P is a polymerizable group, preferably an acryl, methacryl, vinyl, vinyloxy, propenyl ether, epoxy, oxetane or styrene group, Sp is a spacer group or a single bond, A$^1$ is, in case of multiple occurrence independently of one another, selected from carbocylic, heterocyclic, aromatic or heteroaromatic groups, which are optionally substituted by one or more groups L, A$^2$ and A$^3$ are independently of each other selected from 1,4-phenylene or naphthalene-2,6-diyl, wherein one or more CH groups may be replaced by N, and which are optionally substituted by one or more groups L, Z$^1$ is in case of multiple occurrence independently of one another selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH═CH—, —CY$^1$═CY$^2$—, —CH═N—, —N═CH—, —N═N—, —CH═CR$^0$—, —C≡C—, —CH═CH—COO—, —OCO—CH═CH—, CR$^0$R$^{00}$ or a single bond, L is in case of multiple occurrence independently of one another selected from P-Sp-, F, Cl, Br, I, —CN, —NO$_2$, —NCO, —NCS, —OCN, —SCN, —C(═O)NR$^0$R$^{00}$, —C(═O)X, —C(═O)OR$^0$, —C(═O)R$^0$, —NR$^0$R$^{00}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein X is halogen, R is H, alkyl, alkoxy, thioalkyl, alkylcarbonyl, alkoxycarbonyl, alkylcarbonyloxy or alkoxycarbonyloxy with 1 to 20 C atoms more, preferably 1 to 15 C atoms which are optionally fluorinated, or is Y$^0$ or P-Sp-, Y$^0$ is halogen, CN, NO$_2$, OCH$_3$, OCN, SCN, NCS, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, preferably F, Cl, CN, NO$_2$, OCH$_3$, or mono- oligo- or polyfluorinated alkyl or alkoxy with 1 to 4 C atoms, Y$^1$ and Y$^2$ independently of each other denote H, F, Cl or CN, R$^0$ and R$^{00}$ are independently of each other H or alkyl with 1 to 12 C-atoms, m1 and m2 are independently of each other 0, 1, 2, 3 or 4, wherein preferably, in case m1 and m2 are 0, one or both of A$^2$ and A$^3$ denote 1,4-phenylene that is at least monosubstituted by L, or optionally substituted naphthalene-2,6-diyl.

Above and below, "carbyl group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.).

"Hydrocarbyl group" denotes a carbyl group, which additionally contains one or more H atoms and optionally one or more heteroatoms, such as, for example, N, O, S, P, Si, Se, As, Te or Ge.

"Halogen" denotes F, Cl, Br or I.

A carbyl or hydrocarbyl group can be a saturated or unsaturated group. Unsaturated groups are, for example, aryl, alkenyl or alkinyl groups. A carbyl or hydrocarbyl group having more than 3 C atoms can be straight chain, branched and/or cyclic and may contain spiro links or condensed rings.

Above and below, the terms "alkyl", "aryl", "heteroaryl", etc., also encompass polyvalent groups, for example alkylene, arylene, heteroarylene, etc. The term "aryl" denotes an aromatic carbon group or a group derived there from. The term "heteroaryl" denotes "aryl" in accordance with the above definition containing one or more heteroatoms.

Preferred carbyl and hydrocarbyl groups are optionally substituted alkyl, alkenyl, alkinyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms. Further preferred carbyl and hydrocarbyl groups are $C_1$-$C_{40}$ alkyl, $C_2$-$C_{40}$ alkenyl, $C_2$-$C_{40}$ alkinyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkinyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbyl and hydrocarbyl groups are straight-chain, branched or cyclic alkyl radicals having 1 to 40, preferably 1 to 25 C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoro-methyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkinyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzo-pyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, iso-indole, indolizine, indazole, benzimidazole, benzotriazole, purine, naphth-imidazole, phenanthrimidazole, pyridimidazole, pyrazinimidazole, quinoxa-linimidazole, benzoxazole, naphthoxazole, anthroxazole, phenanthroxa-zole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenan-throline, thieno[2,3b]thiophene, thieno[3,2b]thiophene, dithienothiophene, isobenzothiophene, dibenzothiophene, benzothiadiazothiophene, or corn-binations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbyl and hydrocarbyl radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, OH, —CN, —NO$_2$, —NCO, —NCS, —OCN, —SCN, —C(=O)N(R$^x$)$_2$, —C(=O)Y$^1$, —C(=O)R$^x$, —C(=O)OR$^x$, —N(R$^x$)$_2$, in which R$^x$ has the above-mentioned meaning, and Y$^1$ denotes halogen, optionally substituted silyl, optionally substituted aryl or heteroaryl having 4 to 40, preferably 4 to 20 ring atoms, and straight-chain or branched alkyl, alkenyl, alkinyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, R$^0$, —OR$^0$, —CO—R$^0$, —CO—O—R$^0$, —O—CO—R$^0$ or —O—CO—O—R$^0$, in which R$^0$ has the above-mentioned meaning.

Particularly preferred substituents L are, for example, F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, furthermore phenyl.

In the formula shown above and below, a substituted phenylene ring

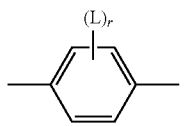

is preferably

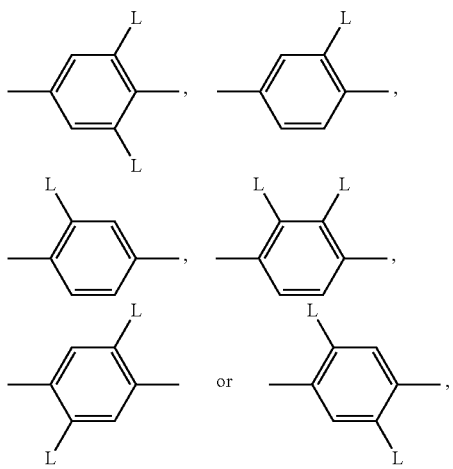

in which L has, on each occurrence identically or differently, one of the meanings given above and below, and is preferably F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, OCH$_3$, COCH$_3$, OCF$_3$ or P-Sp-, most preferably F, Cl, CH$_3$, OCH$_3$, COCH$_3$ or OCF$_3$.

The polymerizable group P is preferably selected from groups containing a C=C double bond or CC triple bond, and groups which are suitable for polymerization with ring opening, such as, for example, oxetane or epoxide groups.

Very preferably the polymerizable group P is selected from the group consisting of CH$_2$=CW$^1$—COO—, CH$_2$=CW$^1$—CO—,

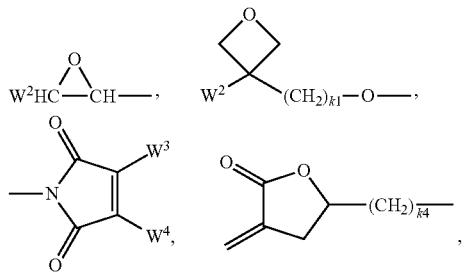

CH$_2$=CW$^2$—(O)$_{k3}$—,  CW$^1$=CH—CO—(O)$_{k3}$—, CW$^1$=CH—CO—NH—,  CH$_2$=CW$^1$—CO—NH—, CH$_3$—CH=CH—O—,  (CH$_2$=CH)$_2$CH—OCO—, (CH$_2$=CH—CH$_2$)$_2$CH—OCO—,  (CH$_2$=CH)$_2$CH—O—, (CH$_2$=CH—CH$_2$)$_2$N—,  (CH$_2$=CH—CH$_2$)$_2$N—CO—, CH$_2$=CW$^1$—CO—NH—,  CH$_2$=CH—(COO)$_{k1}$-Phe-(O)$_{k2}$—,  CH$_2$=CH—(CO)$_{k1}$-Phe-(O)$_{k2}$—, Phe-CH=CH—, in which W$^1$ denotes H, F, Cl, CN, CF$_3$, phenyl or alkyl having 1 to 5 C atoms, in particular H, F, Cl or CH$_3$, W$^2$ denotes H or alkyl having 1 to 5 C atoms, in particular H, methyl, ethyl or n-propyl, W$^3$ and W$^4$ each, independently of one another, denote H, Cl or alkyl having 1 to 5 C atoms, Phe denotes 1,4-phenylene, which is optionally substituted by one or more radicals L as being defined above but being different from P-Sp, and k$_1$, k$_2$ and k$_3$ each, independently of one another, denote 0 or 1, k$_3$ preferably denotes 1, and k$_4$ is an integer from 1 to 10.

Particularly preferred groups P are CH$_2$=CH—COO—, CH$_2$=C(CH$_3$)—COO—, CH$_2$=CF—COO—, CH$_2$=CH—, CH$_2$=CH—O—, (CH$_2$=CH)$_2$CH—OCO—, (CH$_2$=CH)$_2$CH—O—,

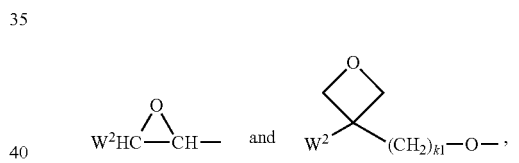

in particular vinyloxy, acrylate, methacrylate, fluoroacrylate, chloroacrylate, oxetane and epoxide, most preferably acrylate or methacrylate.

In a further preferred embodiment of the invention, all polymerizable compounds and sub-formulae thereof contain, instead of one or more radicals P-Sp-, one or more branched radicals containing two or more polymerizable groups P (multireactive polymerizable radicals). Suitable radicals of this type, and polymerizable compounds containing them, are described, for example, in U.S. Pat. No. 7,060,200 B1 or US 2006/0172090 A1.

Particular preference is given to multireactive polymerizable radicals selected from the following formulae:

| | |
|---|---|
| —X-alkyl-CHP$^1$—CH$_2$—CH$_2$P$^2$ | I*a |
| —X-alkyl-C(CH$_2$P$^1$)(CH$_2$P$^2$)—CH$_2$P$^3$ | I*b |
| —X-alkyl-CHP$^1$CHP$^2$—CH$_2$P$^3$ | I*c |
| —X-alkyl-C(CH$_2$P$^1$)(CH$_2$P$^2$)—C$_{aa}$H$_{2aa+1}$ | I*d |
| —X-alkyl-CHP$^1$—CH$_2$P$^2$ | I*e |
| —X-alkyl-CHP$^1$P$^2$ | I*f |
| —X-alkyl-CP$^1$P$^2$—C$_{aa}$H$_{2aa+1}$ | I*g |

—X-alkyl-C(CH$_2$P$^1$)(CH$_2$P$^2$)—CH$_2$OCH$_2$—C(CH$_2$P$^3$)(CH$_2$P$^4$)CH$_2$P$^5$　　　　I*h —X-alkyl-CH((CH$_2$)$_{aa}$P$^1$)((CH$_2$)$_{bb}$P$^2$)　　　　I*i —X-alkyl-CHP$^1$CHP$^2$—C$_{aa}$H$_{2aa+1}$　　　　I*k in which alkyl denotes a single bond or straight-chain or branched alkylene having 1 to 12 C atoms, in which one or more non-adjacent CH$_2$ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where R$^x$ has the above-mentioned meaning and preferably denotes R$^0$ as defined above, aa and bb each, independently of one another, denote 0, 1, 2, 3, 4, 5 or 6, X has one of the meanings indicated for X', and P$^{1-5}$ each, independently of one another, have one of the meanings indicated above for P.

Preferred spacer groups Sp are selected from the formula Sp'-X', so that the radical "P-Sp-" conforms to the formula "P-Sp'-X'—", where Sp' denotes alkylene having 1 to 20, preferably 1 to 12 C atoms, which is optionally mono- or polysubstituted by F, Cl, Br, I or CN and in which, in addition, one or more non-adjacent CH$_2$ groups may each be replaced, independently of one another, by —O—, —S—, —NH—, —NR$^{01}$—, —SiR$^{01}$R$^{02}$—, —CO—, —COO—, —OCO—, —OCO—O—, —S—CO—, —CO—S—, —NR$^{01}$—CO—O—, —O—CO—NR$^{01}$—, —NR$^{01}$—CO—NR$^{01}$—, —CH=CH— or —C≡C— in such a way that O and/or S atoms are not linked directly to one another, X' denotes —O—, —S—, —CO—, —COO—, —OCO—, —O—COO—, —CO—NR$^{01}$—, —NR$^{01}$—CO—, —NR$^{01}$—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —CH=CH—COO—, —OCO—CH=CH— or a single bond, R$^{01}$ and R$^{02}$ each, independently of one another, denote H or alkyl having 1 to 12 C atoms, and Y$^{01}$ and Y$^{02}$ each, independently of one another, denote H, F, Cl or CN.

X' is preferably —O—, —S—, —CO—, —COO—, —OCO—, —O—COO—, —CO—NR$^0$—, —NR$^{01}$—CO—, —NR$^{01}$—CO—NR$^{01}$— or a single bond.

Typical spacer groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{01}$R$^{02}$—O)$_{p1}$—, in which p1 is an integer from 1 to 12, q1 is an integer from 1 to 3, and R$^{01}$ and R$^{02}$ have the above-mentioned meanings.

Particularly preferred groups —X'-Sp'- are —(CH$_2$)$_{p1}$—, —O—(CH$_2$)$_{p1}$—, —OCO—(CH$_2$)$_{p1}$—, —OCOO—(CH$_2$)$_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethyl-ene-N-methyliminoethylene, 1-methylalkylene, ethenylene, propenylene and butenylene.

More preferably, the compounds of formula I are selected from compounds of formula I wherein A$^2$ is 1,4-phenylene or naphthalene 2,6-diyl, each being optionally substituted with one or more groups L, A$^3$ is 1,4-phenylene or naphthalene 2,6-diyl, each being optionally substituted with one or more groups L, A$^1$ is 1,4-phenylene or naphthalene 2,6-diyl, each being optionally substituted with one or more groups L, Z$^1$ is —COO—, —OCO—, —C≡C— or a single bond, very preferably —COO— or —C≡C—, m1 is 0 or 1, m2 is 0 or 1, preferably 0, m1+m2=0 or 1.

Very preferred compounds of formula I are selected from the group of compounds of formulae Ia to Ip,

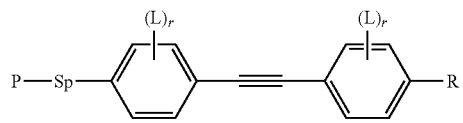

Ia

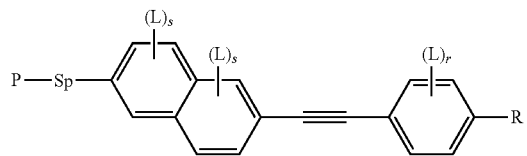

Ib

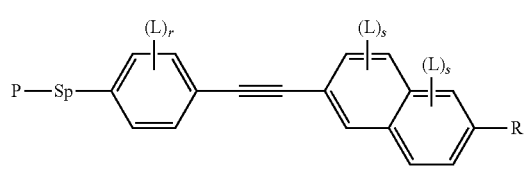

Ic

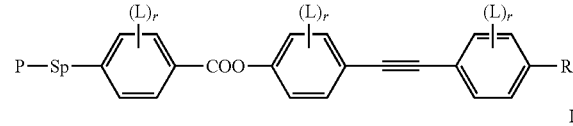

Id

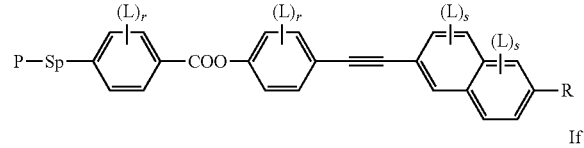

Ie

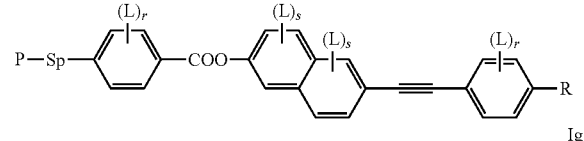

If

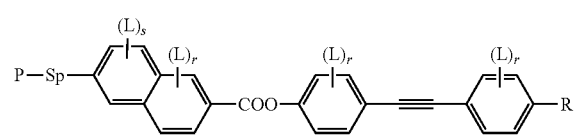

Ig

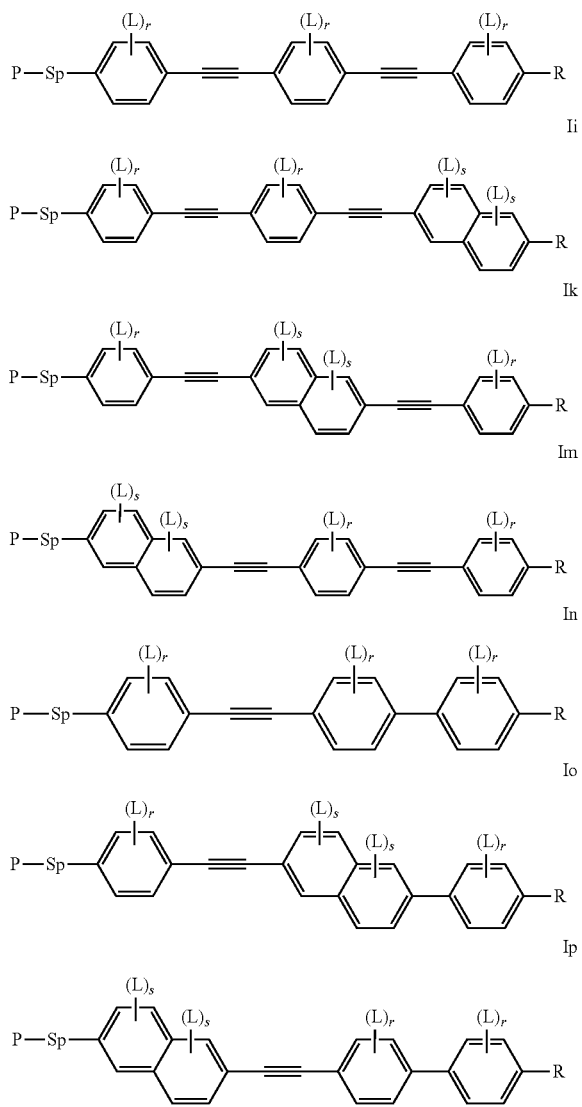

wherein P, Sp, L and R have one of the meanings given above in formula I, r is 0, 1, 2, 3 or 4, and s is 0, 1, 2 or 3, very preferably R denotes P-Sp-, CN, OCH$_3$ or SC H$_3$.

Preferably the polymerizable liquid crystalline component A comprises one or more compounds comprising two or more polymerizable groups (di- or multireactive compounds). Preferred are those of formula I, or its preferred subformulae Ia to Ip, wherein R denotes P-Sp.

Further preferred compounds comprising two or more polymerizable groups (di- or multireactive compounds) are preferably selected from formula II, P-Sp-MG-Sp-P    II wherein P and Sp have, in case of multiple occurrences independently of one another, the meanings given above in formula I, and MG is a rod-like mesogenic group that is optionally chiral.

MG is preferably selected of formula III

-(A$^{11}$-Z$^{11}$)$_m$-A$^{22}$-    III wherein

A$^{11}$ and A$^{22}$ are, in case of multiple occurrence independently of one another, an aromatic or alicyclic group, which optionally contains one or more heteroatoms selected from N, O and S, and is optionally mono- or polysubstituted by L as defined above, Z$^{11}$ in case of multiple occurrence independently of one another denotes —O—, —S—, —CO—, —OCO—, —OCO—, —S—CO—, —CO—S—, —O—COO—, —CO—NR$^0$—, —NR$^0$—CO—, —NR$^0$—CO—NR$^{00}$, —NR$^0$—CO—O—, —O—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —CH=CH—COO—, —OCO—CH=CH— or a single bond, R$^0$ and R$^{00}$ independently of each other denote H or alkyl with 1 to 12 C-atoms, Y$^1$ and Y$^2$ independently of each other denote H, F, Cl or CN, m is 0, 1, 2, 3 or 4.

Preferred groups A$^{11}$ and A$^{22}$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, naphthalene, tetrahydronaphthalene, anthracene and phenanthrene, all of which are optionally substituted by one or more groups L.

Particular preferred groups A$^{11}$ and A$^{22}$ are selected from 1,4-phenylene, pyridine-2,5-diyl, pyrimidine-2,5-diyl, thiophene-2,5-diyl, naphthalene-2,6-diyl, 1,2,3,4-tetrahydronaphthalene-2,6-diyl, indane-2,5-diyl, bicyclooctylene or 1,4-cyclohexylene wherein one or two non-adjacent CH$_2$ groups are optionally replaced by O and/or S, wherein these groups are unsubstituted, mono- or polysubstituted by L as defined above.

Further preferred compounds of formula II are selected from the group consisting of the following direactive compounds of formulae (DR1) to (DR5),

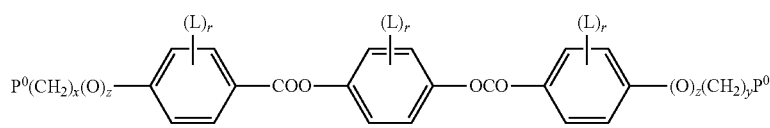

(DR1)

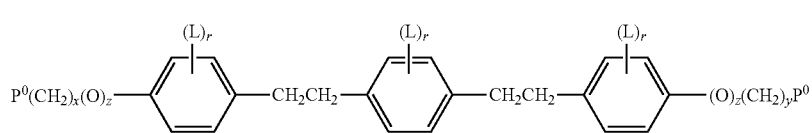

(DR2)

-continued

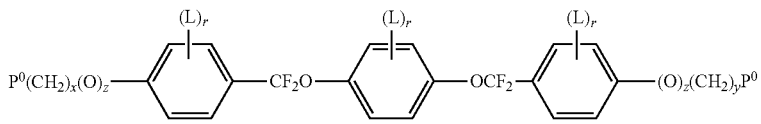
(DR3)

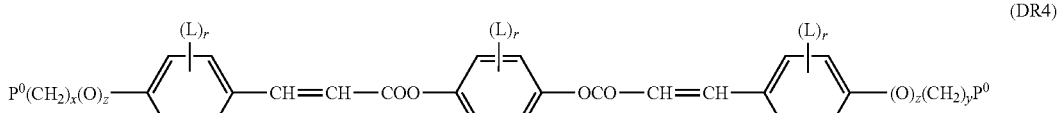
(DR4)

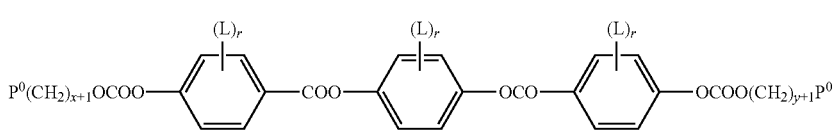
(DR5)

wherein
$P^0$ is, in case of multiple occurrences independently of one another, a polymerizable group, preferably an acryl, methacryl, oxetane, epoxy, vinyl, vinyloxy, propenyl ether or styrene group, L is, in case of multiple occurrences independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, x and y are independently of each other 0 or identical or different integers from 1 to 12, z is 0 or 1, with z being 0 if the adjacent x or y is 0, and wherein the benzene rings can additionally be substituted with one or more identical or different groups L.

The compounds of formula I and II can be synthesized according to or in analogy to methods which are known per se and which are described in the literature and in standard works of organic chemistry such as, for example, Houben-Weyl, Methoden der organischen Chemie, Thieme-Verlag, Stuttgart.

In addition to the compounds of formulae I and II, the liquid crystalline medium can also comprise one or more further RMs. These further RMs are preferably calamitic monomers. Very preferably, these further RMs are selected from the formula IV, $$P\text{-}Sp\text{-}MG\text{-}R^{04} \qquad\qquad IV$$

wherein P, Sp and MG have the meanings given above, $R^{04}$ denotes F, Cl, Br, I, —ON, —NO$_2$, —NCO, —NCS, —OCN, —SCN, —C(=O)NR$^0$R$^{00}$, —C(=O)X, —C(=O)OR$^0$, —C(O)R$^0$, —NR$^0$R$^{00}$, —OH, —SF$_5$, optionally substituted silyl, straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein X is halogen, and $R^0$ and $R^{00}$ are independently of each other H or alkyl with 1 to 12 C-atoms.

The additional RMs of the polymerizable liquid crystalline medium can be prepared by methods which are known per se and which are described in standard works of organic chemistry like for example Houben-Weyl, Methoden der organischen Chemie, Thieme-Verlag, Stuttgart. Suitable RMs are disclosed for example in WO 93/22397, EP 0 261 712, DE 195 04 224, WO 95/22586, WO 97/00600, U.S. Pat. Nos. 5,518,652, 5,750,051, 5,770,107 and 6,514,578. Examples of particularly suitable and preferred RMs are shown in the following list.

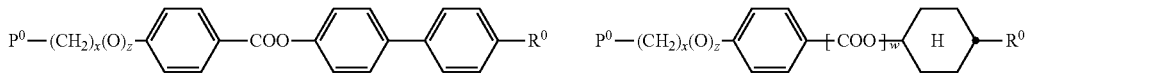
(MR1)

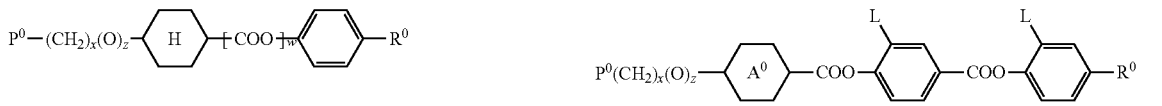
(MR2) (MR3)

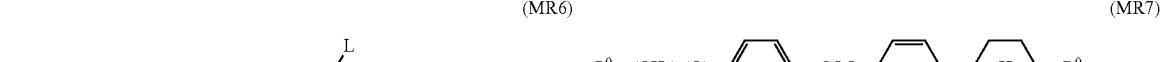
(MR4) (MR5)

(MR6) (MR7)

(MR8)
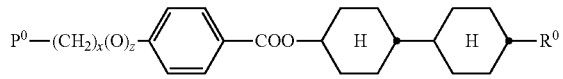
(MR9)
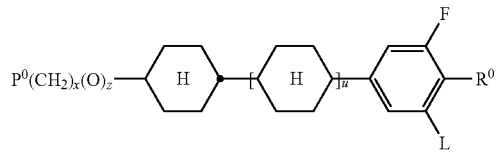
(MR10)
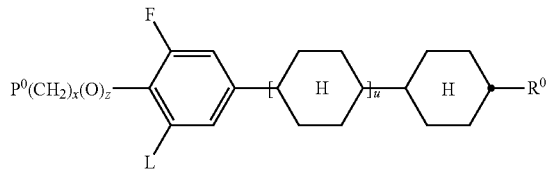
(MR11)
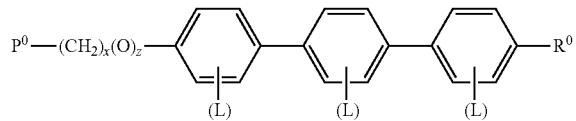
(MR12)
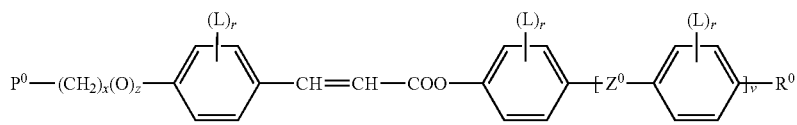
(MR13)
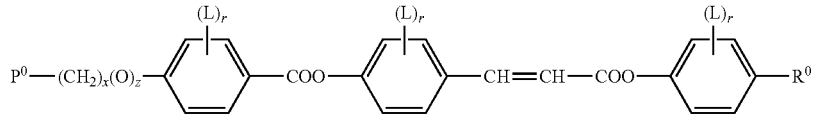
(MR14)
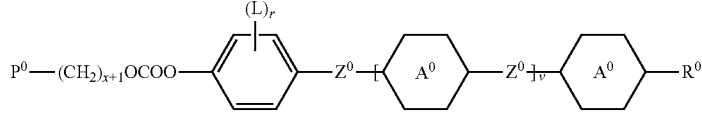
(MR15)
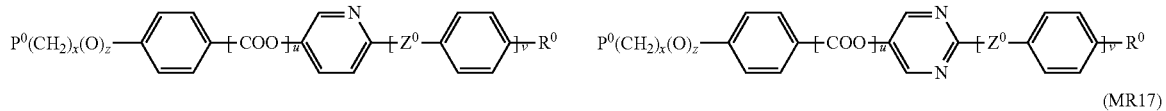
(MR16)
(MR17)
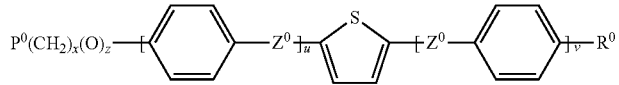
(MR18)
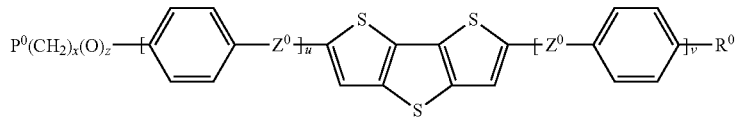
(MR19)
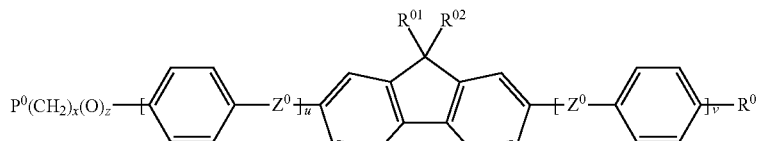
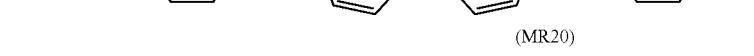
(MR20)
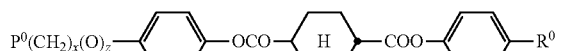
(MR21)
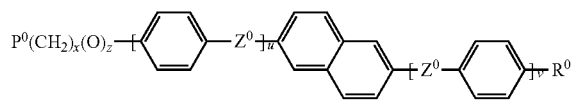
(MR22)
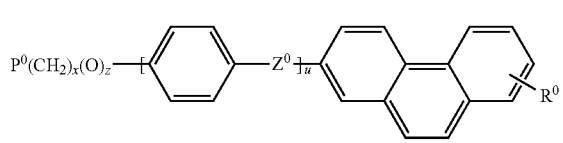

wherein
A⁰ is, in case of multiple occurrence independently of one another, 1,4-phenylene that is optionally substituted with 1, 2, 3 or 4 groups L, or trans-1,4-cyclohexylene,
P⁰ is, in case of multiple occurrences independently of one another, a polymerizable group, preferably an acryl, methacryl, oxetane, epoxy, vinyl, vinyloxy, propenyl ether or styrene group,
Z⁰ is, in case of multiple occurrence independently of one another, —COO—, —OCO—, —CH$_2$CH$_2$—, —CH=CH—, —CH=CH—COO—, —OCO—CH=CH— or a single bond,
R⁰ is alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated, or is Y⁰ or P—(CH$_2$)$_y$—(O)$_z$—, preferably alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated or Y⁰,
Y⁰ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms,
$R^{01,02}$ are independently of each other H, R⁰ or Y⁰,
L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
u and v are independently of each other 0, 1 or 2,
w is 0 or 1,
x and y are independently of each other 0 or identical or different integers from 1 to 12,
z is 0 or 1, with z being 0 if the adjacent x or y is 0,
and wherein the benzene rings can additionally be substituted with one or more identical or different groups L.

Generally, the presence of more than 12% by weight of the total medium of non-mesogenic compounds leads besides other non-favourable effects, e.g. to a significant decrease of the birefringence.

In a preferred embodiment, the non-mesogenic component B, if present, comprises one or more mono-, di- or multireactive polymerizable non-mesogenic compounds, one or more additives like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes, pigments or nanoparticles.

Suitable stabilizers or inhibitors prevent undesired spontaneous polymerization. Preferably, the non-mesogenic component B comprises one or more stabilizers or inhibitors in an amount of 0 to 0.1% by weight of the total medium, very preferably 0 to 0.2% by weight of the total medium, for example selected from the commercially available Irganox® series (Ciba AG), like Irganox 1076.

Polymerization of the polymerizable liquid crystalline material is preferably carried out in the presence of a polymerization initiator. For this purpose, the non-mesogenic component B preferably comprises one or more initiators. For example, when polymerizing by means of UV light, a photoinitiator can be used that decomposes under UV irradiation to produce free radicals or ions that start the polymerization reaction. For polymerizing acrylate or methacrylate groups preferably, a radical photoinitiator is used. For polymerizing vinyl, epoxide, or oxetane groups preferably, a cationic photoinitiator is used. It is also possible to use a thermal polymerization initiator that decomposes when heated to produce free radicals or ions that start the polymerization. Suitable for free-radical polymerization are, for example, the commercially available photoinitiators Irgacure651®, Irgacure184®, Irgacure907®, Irgacure369® or Darocure1173® (Ciba AG). If an initiator is employed, its proportion is preferably 0.001 to 5% by weight of the total medium, particularly preferably 0.001 to 1% by weight of the total medium. A typical cationic photoinitiator is for example UVI 6974 (Union Carbide).

The concentration of the polymerization initiator in the polymerizable liquid crystalline medium is preferably from 0.01 to 10% by weight of the total medium, very preferably from 0.05 to 6% by weight of the total medium.

The component B might comprise also one or more surfactants, which promote a specific surface alignment of the liquid crystalline molecules. Suitable surfactants are described for example in J. Cognard, Mol. Cryst. Liq. Cryst. 78, Supplement 1, 1-77 (1981). Preferred aligning agents for planar alignment are for example non-ionic surfactants, preferably fluorocarbon surfactants such as the commercially available Fluorad FC-171® (from 3M Co.) or Zonyl FSN® (from DuPont), multiblock surfactants as described in GB 2 383 040 or polymerizable surfactants as described in EP 1 256 617 A1.

The non-mesogenic component B may also comprise one or more dyes having an absorption maximum adjusted to the wavelength of the radiation used for polymerization, in particular UV dyes like e.g. 4,4"-azoxy anisole or Tinuvin® dyes (from Ciba AG, Basel, Switzerland).

In a preferred embodiment, the non-mesogenic component B comprises one or more monoreactive polymerizable non-mesogenic compounds, preferably in an amount of 0 to 10% by weight of the total medium, more preferably in an amount of 0 to 5% by weight of the total medium. Typical examples are alkylacrylates or alkylmethacrylates, for example ethyl (meth) acrylate, propyl (meth) acrylate, butyl (meth) acrylate, isobutyl (meth) acrylate, pentyl (meth) acrylate, isoamyl (meth) acrylate, hexyl (meth) acrylate, 2-ethylhexyl(meth)acrylate rate, octyl (meth) acrylate, isooctyl (meth) acrylate, decyl (meth) acrylate, lauryl (meth) acrylate, 2-methoxy ethyl (meth) acrylate, 2-ethoxyethyl (meth) acrylate, 2-butoxyethyl (meth) acrylate, 2-(2-methoxyethoxy) ethyl (meth) acrylate, 2-(2-ethoxyethoxy) ethyl (meth) acrylate, etc.

In another preferred embodiment, the non-mesogenic component B comprises one or more di- or multireactive polymerizable non-mesogenic compounds, preferably in an amount of 0 to 10% by weight of the total medium, more preferably in an amount of 0 to 5% by weight of the total medium, alternatively or in addition to the di- or multireactive polymerizable mesogenic compounds. Typical examples of direactive non-mesogenic compounds are alkyldiacrylates or alkyldimethacrylates with alkyl groups of 1 to 20 C atoms, especially hexandiol di(meth)acrylate. Typical examples of multireactive non-mesogenic compounds are tri methylpropanetrimethacrylate or pentaerythritoltetraacrylate.

It is also possible to add to the non-mesogenic component B one or more chain transfer agents in order to modify the physical properties of the polymer film. Especially preferred are thiol compounds, for example monofunctional thiols like dodecane thiol or multifunctional thiols like trimethylpropane tri(3-mercaptopropionate). Very preferred are mesogenic or liquid crystalline thiols as disclosed for example in U.S. Pat. Nos. 5,948,486, 6,096,241, 6,319,963 or 6,420, 001. By using chain transfer agents the length of the free polymer chains and/or the length of the polymer chains between two crosslinks in the polymer film can be controlled. When the amount of the chain transfer agent is increased, the polymer chain length in the polymer film decreases.

The non-mesogenic component B may also comprise a polymeric binder or one or more monomers capable of forming a polymeric binder, and/or one or more dispersion auxiliaries. Suitable binders and dispersion auxiliaries are disclosed for example in WO 96/02597. Preferably, however, the polymerizable material does not contain a binder or dispersion auxiliary.

As mentioned above, a suitable polymerizable liquid crystalline medium for a birefringent RM lens according to the present invention consists of several compounds, preferably of 2 to 30, more preferably of 3 to 20 and most preferably of 4 to 10 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so-called pre-mixtures, which can be e.g. homologous or eutectic mixtures of compounds or using so-called multi-bottle-systems, the constituents of which are ready to use mixtures themselves.

Preferably the amount of the polymerizable liquid-crystalline component A in the medium is more than 88% by weight of the total medium, more preferably more than 90% by weight of the total medium, and even more preferably more than 92% by weight of the total medium.

Preferably, the amount of the non-polymerizable component B is at most 12% by weight of the total medium, more preferably at most 10% by weight of the total medium, and even more preferably at most 8% by weight of the total medium.

The polymerizable liquid-crystalline component A preferably comprise
  one or more compounds of formula I in a total concentration in the range from 3 to 50% by weight of the total medium, more preferably in the range from 5 to 45% by weight of the total medium and even more preferably in the range from 10 to 40% by weight of the total medium, preferably these compounds are selected from the group of the sub formulae Ia to Ip, and
the non-mesogenic component B preferably comprise
  one or more non-mesogenic compounds in a total concentration at most 12% by weight of the total medium, more preferably at most 8% by weight of the total medium and even more preferably at most 5% by weight of the total medium, preferably these compounds are selected from one or more mono-, di- or multireactive polymerizable non-mesogenic compounds, stabilizers and photoinitiators.

More preferably, the polymerizable liquid-crystalline component A comprise,
  preferably one, two, three or more monoreactive mesogenic compounds of formulae I, preferably selected from compounds of formulae Ia, Ib, Id, and Ih, preferably in concentration in the range from 3 to 50% by weight of the total medium, more preferably 5 to 45% by weight of the total medium, even more preferably 10 to 40% by weight of the total medium, and/or
  preferably one, two, three or more direactive mesogenic compounds of formula I and/or II, preferably selected from compounds of formulae Ih and DR1, preferably in concentration in the range from 3 to 80% by weight of the total medium, more preferably 5 to 70% by weight of the total medium, even more
  preferably one, two, three or more mesogenic compounds of formula IV, preferably selected from formula MR1, MR5, MR6 and MR7, preferably in concentration in the range from 1 to 90% by weight of the total medium, more preferably 5 to 80% by weight of the total medium, even more preferably 10 to 70% by weight of the total medium, and
the non-mesogenic component B preferably comprises
  one or more non-mesogenic compounds in a total concentration of less than 12% by weight of the total medium, more preferably not at most 8% by weight of the total medium and even more preferably at most 5% by weight of the total medium, preferably these compounds are selected from direactive polymerizable non-mesogenic compounds, such as hexandiol diacrylate; and/or stabilizers, which are preferably selected from the commercially available Irganox® series (Ciba AG), like Irganox 1076; and/or photoinitiators which are preferably selected from the group of Irgacure651®, Irgacure184®, Irgacure907®, Irgacure369® or Darocure1173® (Ciba AG).

The general methods for the preparation of birefringent RM lens according to this invention are known to the ordinary expert and can be performed for example in analogy to the disclosure of JP2012-137616 A1.

In a preferred embodiment, a method of production comprise
  filling a melt of the polymerizable liquid crystalline medium into a plano-convex lens mould at elevated temperature,
  annealing the polymerizable liquid crystalline medium in the mould at elevated temperature,
  cooling the mould,
  curing of the polymerizable liquid crystalline medium,
  optionally removing the mould.

In another preferred embodiment, method comprises the steps of
  providing a layer of a melt of the polymerizable liquid crystalline medium onto a substrate at elevated temperature,
  providing an inverse lens mould on top of the coated polymerizable liquid crystalline medium,
  annealing the polymerizable liquid crystalline medium in the mould at elevated temperature,
  cooling the mould,
  curing of the polymerizable liquid crystalline medium,
  optionally removing the mould.

The substrate used for the birefringent RM lens the present invention is a substrate usually used for liquid crystal devices, displays, optical parts, and optical films. It is not limited to any specifics as long as it has enough heat resistance to endure the heating after coating the melted birefringent RM lens material of the present invention or the heating during the liquid crystal device manufacturing.

The examples of such the substrate, which also can be the material of choice for the lens mould, are a glass substrate, metal substrate, ceramic substrate, and plastic substrate. Particularly when the substrate is the organic material, the examples are cellulose derivatives, polyolefin, polyester, polyolefin, polycarbonate, polyacrylate, poly-allylate, polyether sulfon, polyimide, poly-phenylene sulfide, polyphenylene ether, nylon, and polystyrene. Among them, polyester, polystyrene, polyolefin, cellulose derivatives, polyallylate, and polycarbonate are preferred.

As a coating method to obtain the birefringent RM lens of the present invention, the well-known and commonly used method can be used. The examples are an applicator method, bar coating method, spin coating method, gravure print method, flexographic method, inkjet method, die coating method, cap coating method, and the dipping method.

The preferred coating temperature is dependent, inter alia, on the melting point of the polymerizable liquid-crystalline medium.

Preferably, the coated film of the polymerizable liquid crystalline medium exhibit a room temperature stability against crystallization for at least 1 hour, more preferably for at least 3 hours, and most preferably for at least 16 hours.

The thickness of the coated layer of the melt of the polymerizable liquid crystalline medium is dependent, inter alia, on the thickness of used lens mould or the preferred lens thickness in dependence of the value for the birefringence of the RM lens.

Initial alignment (e.g. planar alignment) of the polymerizable liquid crystalline medium can be achieved by annealing the material before polymerization, or also by application of an alignment layer, by applying a magnetic or electric field to the coated material, or by the addition of surface-active compounds to the material. Reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

It is also possible to apply an alignment layer onto the substrate and provide the polymerizable liquid crystalline medium onto this alignment layer. Suitable alignment layers are known in the art, like for example rubbed polyimide or alignment layers prepared by photo alignment as described in U.S. Pat. Nos. 5,602,661, 5,389,698 or 6,717,644.

In detail, suitable alignment treatments are for example a stretch treatment, rubbing treatment, polarized UV-visible light irradiation treatment, and the ion beam treatment. In the case that the alignment film is used, the well-known and commonly used alignment film can be used.

Detailed examples of such the alignment film are polyimide, polysiloxane, polyamide, polyvinyl alcohol, polycarbonate, polystyrene, poly-phenylene ether, poly-allylate, polyethylene terephthalate, polyether sulfone, epoxy resin, epoxy acrylate resin, acryl resin, cumarine compound, chalcone compound, cinnamate compound, fulgide compound, anthraquinone compound, azo compound, and aryl ethane compound. For the compounds, which are alignment-processed by the methods beside the rubbing treatment, the use of the light alignment material is preferred.

Forming a birefringent RM lens of the present invention can be carried out by polymerizing polymerizable liquid crystalline medium into a lens shape by using a photo mask. When the photo mask is used, the photo mask is designed in such the manner that the desired lens shape is obtained after the polymerization of the birefringent RM lens material or polymerizable liquid crystalline medium.

However, the coated film of the polymerizable liquid crystalline medium is preferably covered with a lens mould.

When the mould is used, the coating film of the birefringent RM lens material is covered with a plano-convex lens mould having preferably the same refractive index as the ordinary refractive index ($n_o$) of the polymerizable liquid crystalline medium of the present invention, and the polymerization is carried out while being covered.

Polymerization is achieved for example by exposing the polymerizable liquid crystalline medium to actinic radiation. Actinic radiation means irradiation with light, like UV light, IR light or visible light, irradiation with X-rays or gamma rays, or irradiation with high energy particles, such as ions or electrons. Preferably, polymerization is carried out by. As a source for actinic radiation, for example a single UV lamp or a set of UV lamps can be used. When using a high lamp power the curing time can be reduced. Another possible source for actinic radiation is a laser, like for example a UV, IR or visible laser.

When the polymerization is carried out by the UV irradiation, it is generally preferable to irradiate it with the UV ray having less than 390 nm wavelengths, and more preferably with the light having the wavelength of 250 to 370 nm, in concrete. However, in the case that the decomposition of the polymerizable liquid crystal composition is caused by the UV ray having at most 390 nm, it may be preferable to carry out the polymerization treatment with the UV ray having at least 390 nm. This light is preferably diffused light, however in case, a dichroic photo initiator is present, it is preferred to use polarized light.

The curing time is dependent, inter alia, on the reactivity of the polymerizable liquid-crystalline material, the thickness of the coated layer, the type of polymerization initiator and the power of the UV lamp. The curing time is preferably ≤5 minutes, very preferably ≤3 minutes, most preferably ≤1 minute.

A suitable UV radiation power is preferably in the range from 5 to 200 mWcm$^{-2}$, more preferably in the range from 10 to 175 mWcm$^{-2}$ and most preferably in the range from 20 to 150 mWcm$^{-2}$.

In connection with the applied UV radiation and as a function of time, a suitable irradiation dose is preferably in the range from 10 to 7200 mJcm$^{-2}$ more preferably in the range from 500 to 7200 mJcm$^{-2}$ and most preferably in the range from 1000 to 7200 mJcm$^{-2}$.

The curing temperature is desirably a lower temperature than the temperature at which the inhomogeneous polymerization is induced by heat, in addition to the consideration to the transition temperature from the liquid crystal phase to the isotropic phase of the polymerizable liquid crystal composition. Here, when the substrate made of the organic material exceeds the glass transition point, the thermal deformation of the substrate becomes severe.

The preferred curing temperature range is between about 10 to about 100° C., more preferably between about 15 to about 90° C., and even more preferably between about 18 to about 82° C.

Further, the obtained birefringent RM lens can be used by being peeled-off from the substrate.

A polymerizable liquid crystal medium preferably has a clearing point in the range from about 50° C. to about 160° C., especially up to about 140° C.

The optical retardation ($\delta(\lambda)$) of a RM lens as a function of the wavelength of the incident beam ($\lambda$) is given by the following equation:

$$\delta(\lambda)=(2\pi\Delta n\cdot d)/\lambda,$$

wherein (Δn) is the birefringence of the RM lens, (d) is the thickness of the RM lens and λ is the wavelength of the incident beam.

According to Snellius law, the birefringence as a function of the direction of the incident beam is defined as $$\Delta n = \sin \Theta / \sin \Psi$$

wherein sin Θ is the incidence angle or the tilt angle of the optical axis in the film and sin Ψ is the corresponding reflection angle.

Based on these laws, the birefringence and accordingly optical retardation depends on the thickness of a RM lens and the tilt angle of optical axis in the film (cf. Berek's compensator). Therefore, the skilled expert is aware that different optical retardations or different birefringence can be induced either by adjusting the orientation of the liquid-crystalline molecules in the RM lens or by adjusting the lens thickness. Retardation can be measured using a spectroscopic ellipsometer.

Preferably, the birefringence (Δn) of the RM lens in accordance with the present invention is preferably in the range from 0.19 to 0.50, more preferable in the range from 0.20 to 0.45 and even more preferable in the range from 0.21 to 0.40.

The birefringence (Δn) was calculated using the following formula, $$\delta n = \delta(\lambda)/d,$$

wherein
δ(λ) is retardation as explained above and (d) is the thickness of the RM lens as mentioned above. Above and below, the Δn values are given at a wavelength of λ=550 nm.

The difference in retardation between −40° and +40° viewing angle expressed as a percentage of the on axis retardation obtained by the method according to the present invention is preferably at most 5%, more preferably at most 1% and even more preferably 0%

Retardation is measured using a spectroscopic ellipsometer.

The thickness of the RM lens obtained by the method according to the present invention is preferably in the range from 3 to 200 μm, more preferable in the range from 3 to 100 μm and even more preferable in the range from 3 to 30 μm.

The thickness of the RM lens is measured by making a scratch in the polymerized film and measuring the depth of the scratch with an Alpha step surface profileometer.

The birefringent RM lens according to the present invention can be used in a wide variety of electro optical devices, such as autostereoscopic 3D displays, polarized light guide plates, optical drives (DVD, blue ray, CD), etc.

The transmission of the birefringent RM lens at 550 nm is preferably higher than 85%, more preferably higher than 90%, and even more preferably higher than 93%. The transmission of the birefringent RM lens can be measured in a Hitachi 3310 UV-Vis spectrometer.

The yellowness index (b-value) of the birefringent RM lens is preferably lower than 12, more preferably lower than 10.

The yellowness index or b-value in accordance with the CIE LAB colour scale is measured using a Konica Minolta CR300 colour camera, in reflection mode. In this test an empty PI glass cell measures at a "b-value" of 4.14 as a reference.

Accordingly, in a preferred embodiment, the birefringent RM lens can be used in an autostereoscopic display device.

Such device comprises a display panel on top of which is provided a lens arrangement comprising at least one birefringent RM lens.

A suitable display panel according to the present invention is a liquid crystal (LCD), a plasma (PDP), an organic light emitting diode (OLED) or cathode ray tube (CRT) display panel, preferably a liquid crystal display. However, it will be apparent to those skilled in the art that alternative types of display panels may also be employed.

The display panel has an array of display pixels for producing a display image and the display pixels are arranged in rows and columns. In a preferred embodiment, the preferred display pixel pitch is in the range 50 μm to 1000 μm.

In a preferred embodiment of the present invention, a transparent coupling film is laminated between the front side of the display panel and said lens arrangement, which substantially couples the incident light of the display panel at an oblique angle to the lens arrangement. Preferably, this transparent coupling film has a prismatic grid structure.

However, in the preferred embodiment, a plane transparent spacer sheet is laminated between the front side of the display panel and said lens arrangement.

The lens arrangement enables an autostereoscopic image to be viewed. Therefore, each lens arrangement overlies a small group of display pixels in each row or column or at least one display pixel. The lens arrangement projects each display pixel or a group of display pixels in a different direction, to form the several different views. As the user's head moves from left to right, his/her eyes will receive different ones of the several views, in turn.

In a preferred embodiment of the present invention, the lens arrangement in is a lenticular screen plate. A lenticular screen plate is defined by a one-dimensional periodic arrangement of a plurality of lenses, preferably a row of lenses extending parallel to one another. In this connection, the lenticular screen plate can be a cylindrical lens grid disc, elliptical lens grid disc or prismatic lens grid disc, preferably a cylindrical lens grid disc.

The present invention is described above and below with particular reference to the preferred embodiments. It should be understood that various changes and modifications might be made therein without departing from the spirit and scope of the invention.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here. Unless the context clearly indicates otherwise, as used herein plural forms of the terms herein are to be construed as including the singular form and vice versa.

Throughout this application, unless explicitly stated otherwise, all concentrations are given in weight percent and relate to the respective complete medium, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

Preferred features of the invention are summarized in form of a numbered list:

1. Birefringent RM lens obtainable from a polymerizable liquid crystalline medium consisting of
   a polymerizable liquid crystalline component (A) comprising of one or more polymerizable mesogenic compounds, and
   at most 12% by weight of the total medium of a non-mesogenic component (B).
2. Birefringent RM lens according to note 1, wherein component (A) comprises at least one polymerizable mesogenic compound of formula I,

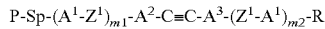

wherein
P is a polymerizable group, preferably an acryl, methacryl, vinyl, vinyloxy, propenyl ether, epoxy, oxetane or styrene group,
Sp is a spacer group or a single bond,
$A^1$ is, in case of multiple occurrence independently of one another, selected from carbocyclic, heterocyclic, aromatic or heteroaromatic groups, which are optionally substituted by one or more groups L,
$A^2$ and $A^3$ are independently of each other selected from 1,4-phenylene or naphthalene-2,6-diyl, wherein one or more CH groups may be replaced by N, and which are optionally substituted by one or more groups L,
$Z^1$ is in case of multiple occurrence independently of one another selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —CO—, —CH=CH—COO—, —OCO—CH=CH—, CR$^0$R$^{00}$ or a single bond, L is in case of multiple occurrence independently of one another selected from P-Sp-, F, Cl, Br, I, —ON, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein X is halogen, R is H, alkyl, alkoxy, thioalkyl, alkylcarbonyl, alkoxycarbonyl, alkylcarbonyloxy or alkoxycarbonyloxy with 1 to 20 C atoms more, preferably 1 to 15 C atoms which are optionally fluorinated, or is Y$^0$ or P-Sp-, Y$^0$ is F, Cl, ON, NO$_2$, OCH$_3$, OCN, SCN, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, preferably F, Cl, CN, NO$_2$, OCH$_3$, or mono- oligo- or polyfluorinated alkyl or alkoxy with 1 to 4 C atoms, $Y^1$ and $Y^2$ independently of each other denote H, F, Cl or CN, R$^0$ and R$^{00}$ are independently of each other H or alkyl with 1 to 12 C-atoms, m1 and m2 are independently of each other 0, 1, 2, 3 or 4, wherein preferably, in case m1 and m2 are 0, one or both of $A^2$ and $A^3$ denote 1,4-phenylene that is at least monosubstituted by L, or optionally substituted naphthalene-2,6-diyl.

3. Birefringent RM lens according to note 1 or 2, wherein component (A) comprises at least one a compound of formula I, which is selected from the group of compounds of formulae Ia to Ip,

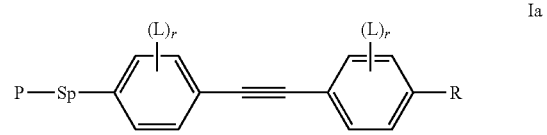

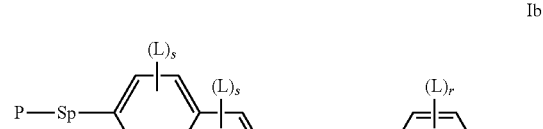

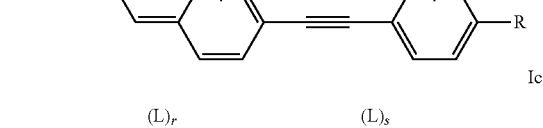

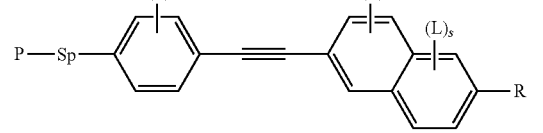

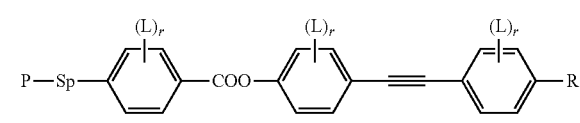

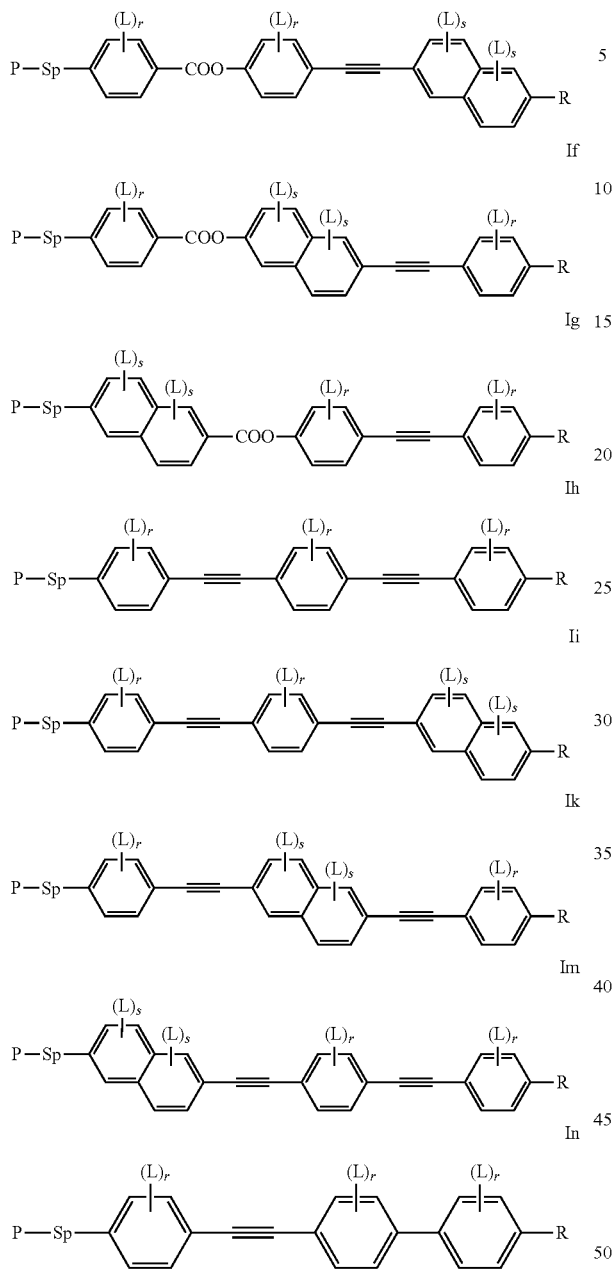

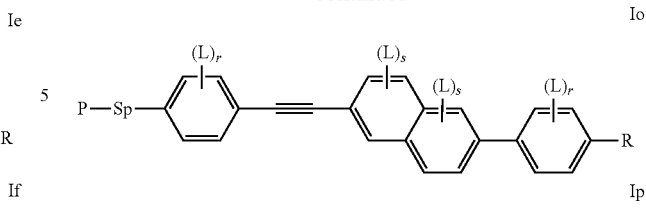

wherein
P, Sp, L and R have one the meanings given above,
r is 0, 1, 2, 3 or 4, and
s is 0, 1, 2 or 3.

4. Birefringent RM lens according to one or more of notes 1 to 3, wherein component (A) comprises at least one polymerizable mesogenic compound of formula II $$P\text{-}Sp\text{-}MG\text{-}Sp\text{-}P \qquad \qquad II$$

wherein
P and Sp have, in case of multiple occurrences independently of one another, the meanings given in formula I
MG is $-(A^{11}\text{-}Z^{11})_m\text{-}A^{22}\text{-}$, wherein
$A^{11}$ and $A^{22}$ are, in case of multiple occurrence independently of one another, an aromatic or alicyclic group, which optionally contains one or more heteroatoms selected from N, O and S, and is optionally mono- or polysubstituted by L as defined above,
$Z^{11}$ in case of multiple occurrence independently of one another denotes —O—, —S—, —CO—, —COO—, —OCO—, —S—CO—, —CO—S—, —O—COO—, —CO—NR$^0$—, —NR$^0$—CO—, —NR$^0$—CO—NR$^{00}$, —NR$^0$—CO—O—, —O—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —CH=CH—COO—, —OCO—CH=CH— or a single bond,
R$^0$ and R$^{00}$ independently of each other denote H or alkyl with 1 to 12 C-atoms,
Y$^1$ and Y$^2$ independently of each other denote H, F, Cl or CN, and
m is 0, 1, 2, 3 or 4.

5. Birefringent RM lens according to one or more of notes 1 to 4, wherein component (A) comprises at least one compound of formula II, which is selected from the group of compounds of formula DR1 to DR5,

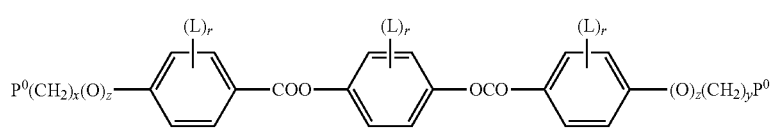

(DR1)

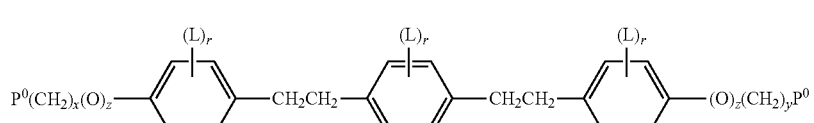

(DR2)

-continued

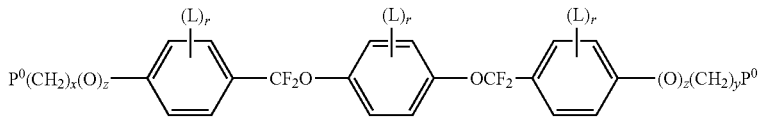
(DR3)

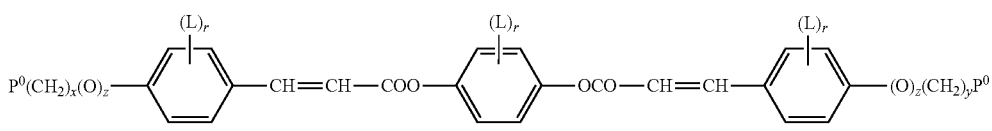
(DR4)

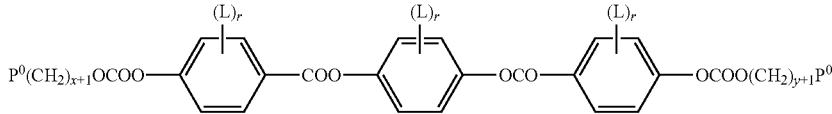
(DR5)

wherein
P⁰ is, in case of multiple occurrences independently of one another, a polymerizable group, preferably an acryl, methacryl, oxetane, epoxy, vinyl, vinyloxy, propenyl ether or styrene group,
L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
x and y are independently of each other 0 or identical or different integers from 1 to 12,
z is 0 or 1, with z being 0 if the adjacent x or y is 0, and wherein the benzene rings can additionally be substituted with one or more identical or different groups L.
6. Birefringent RM lens according to one or more of notes 1 to 5, wherein component (A) comprises at least one polymerizable compound of formula IV, $$P\text{-}Sp\text{-}MG\text{-}R \qquad \text{IV}$$

wherein P, Sp and MG have the meanings given above,
R denotes F, Cl, Br, I, —CN, —NO$_2$, —NCO, —NCS, —OCN, —SCN, —C(=O)NR⁰R⁰⁰, —C(=O)X, —C(=O)OR⁰, —C(=O)R⁰, —NR⁰R⁰⁰, —OH, —SF$_5$, optionally substituted silyl, straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein X is halogen, and
R⁰ and R⁰⁰ are independently of each other H or alkyl with 1 to 12 C-atoms.
7. Birefringent RM lens according to one or more of notes 1 to 6, wherein component (A) comprises at least one compound of formula IV which is selected from the group of compounds of formulae MR1 to MR22,

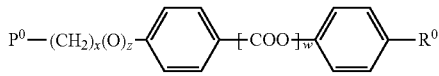 (MR1)

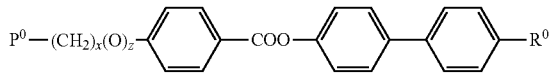 (MR2)

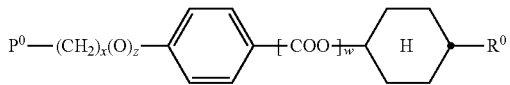 (MR3)

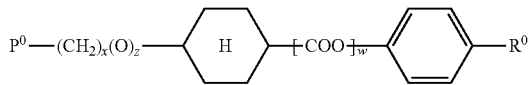 (MR4)

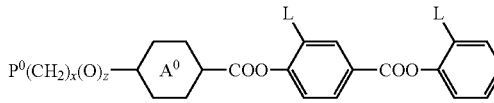 (MR5)

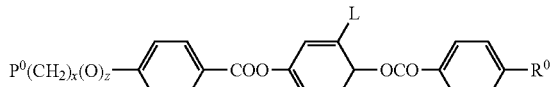 (MR6)

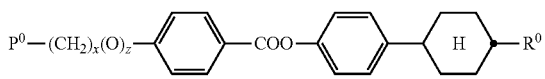 (MR7)

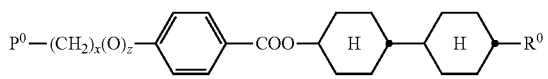 (MR8)

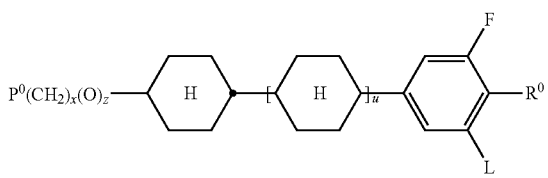 (MR9)

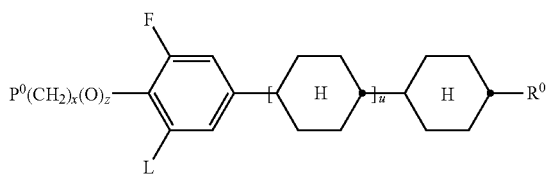 (MR10)

-continued

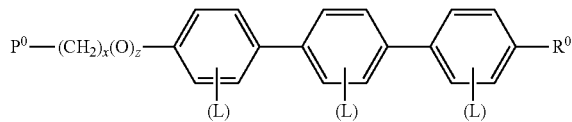
(MR11)

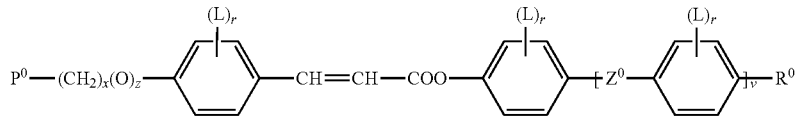
(MR12)

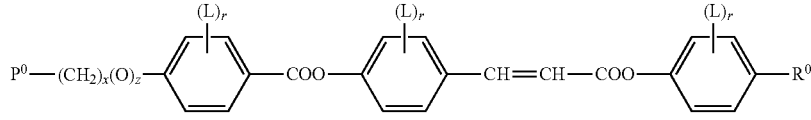
(MR13)

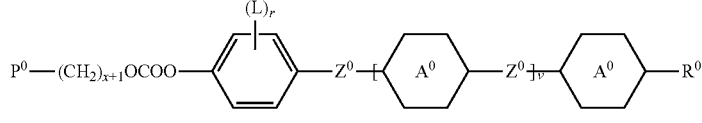
(MR14)

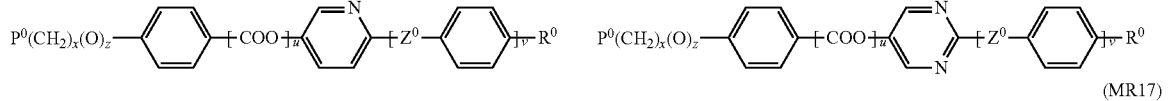
(MR15) (MR16)

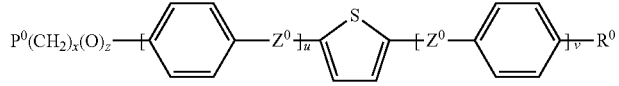
(MR17)

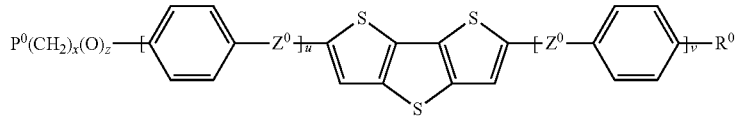
(MR18)

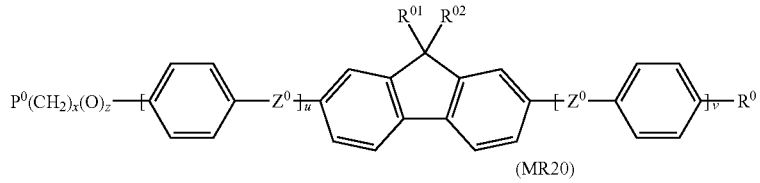
(MR19)

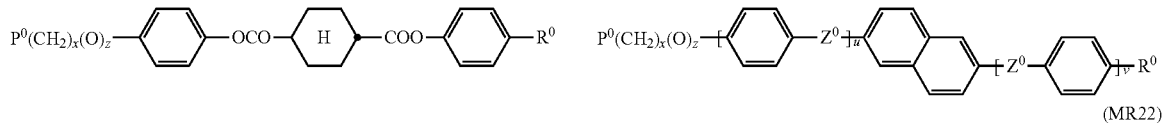
(MR20) (MR21)

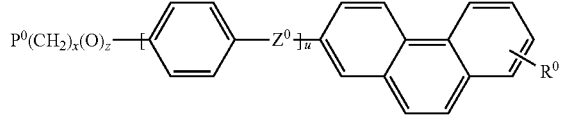
(MR22)

wherein
- $A^0$ is, in case of multiple occurrence independently of one another, 1,4-phenylene that is optionally substituted with 1, 2, 3 or 4 groups L, or trans-1,4-cyclohexylene,
- $P^0$ is, in case of multiple occurrences independently of one another, a polymerizable group,
- $Z^0$ is, in case of multiple occurrence independently of one another, —COO—, —OCO—, —CH$_2$CH$_2$—, —CH=CH—, —CH=CH—COO—, —OCO—CH=CH— or a single bond,
- $R^0$ is alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated, or is $Y^0$ or P—(CH$_2$)$_y$—(O)$_z$—,
- $Y^0$ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms,
- $R^{01,02}$ are independently of each other H, $R^0$ or $Y^0$,
- L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4,
u and v are independently of each other 0, 1 or 2,
w is 0 or 1,
x and y are independently of each other 0 or identical or different integers from 1 to 12,
z is 0 or 1, with z being 0 if the adjacent x or y is 0,
and wherein the benzene rings can additionally be substituted with one or more identical or different groups L.

8. Birefringent RM lens according to one or more of notes 1 to 7, characterized in that, the non-mesogenic component (B) comprises one or more mono-, di- or multireactive polymerizable non-mesogenic compounds, catalysts, sensitizers, stabilizers, polymerization initiators, inhibitors, chain-transfer agents, lubricating agents, wetting agents, dispersing agents, hydrophobing agents, adhesive agents, flow improvers, defoaming agents, deaerators, diluents, reactive diluents, auxiliaries, colourants or pigments.

9. Birefringent RM lens according to one or more of notes 1 to 8, characterized in that, the non-mesogenic component B comprises at least one monoreactive di- or multireactive polymerizable non-mesogenic compound in an amount of not more than 10% by weight of the total medium.

10. Birefringent RM lens according to one or more of notes 1 to 9, characterized in that, the amount of the polymerizable liquid-crystalline component A in the medium is more than 88% by weight of the total medium.

11. Birefringent RM lens according to one or more of notes 1 to 10, characterized in that, the amount of the non-mesogenic component B is at most 12% by weight of the total medium.

12. Birefringent RM lens according to one or more of notes 1 to 11, characterized in that, the amount of the non-mesogenic component B is at most 8% by weight of the total medium.

13. Birefringent RM lens according to one or more of notes 1 to 12, characterized in that, the uncured polymerizable liquid crystalline medium exhibits a room temperature stability against crystallization for at least 1 hour.

14. Birefringent RM lens according to one or more of notes 1 to 13, characterized in that, the birefringence ($\Delta n$) of the RM lens is in the range from 0.19 to 0.50.

15. Method of production of a birefringent RM lens according to one or more of notes 1 to 14, comprising the steps of
providing a layer of a melt of the polymerizable liquid crystalline medium onto a substrate at elevated temperature,
providing an inverse lens mould on top of the coated polymerizable liquid crystalline medium,
annealing the polymerizable liquid crystalline medium in the mould at elevated temperature,
cooling the mould,
curing of the polymerizable liquid crystalline medium,
optionally removing the mould.

16. Use of a birefringent RM lens according to one or more of notes 1 to 14, in an electro optical device.

17. Electro optical device comprising at least one birefringent RM lens according to one or more of notes 1 to 14.

The invention will now be described in more detail by reference to the following examples, which are illustrative only and do not limit the scope of the invention.

Examples

General Procedure

Test cells, are prepared from polymerizable liquid-crystalline media summarized in table 2, comprising the given amounts of the compounds summarized in table 1, by melting the medium, flow filling the medium into a rubbed polyimide glass cell having a thickness of 20 μm, annealing the medium at the given temperature for 3 min, and curing the medium using UV light (250 nm-450 nm bandpass filter) with the specified irradiation dose at the given temperature.

The experimental conditions such as annealing temperatures, curing temperatures and the irradiation doses are summarized in table 3 whereas the physical characteristics, such as the resulting $\Delta n$, the corresponding transmission, and b-value for each example are summarized in table 4.

TABLE 1

Compounds (1) Acrylate-O-(CH$_2$)$_6$-O-C$_6$H$_4$-COO-C$_6$H$_4$-CN (2) Acrylate-O-(CH$_2$)$_6$-O-C$_6$H$_4$-COO-C$_6$H$_4$-OCH$_3$ (3) Acrylate-O(CH$_2$)$_3$O-C$_6$H$_4$-COO-C$_6$H$_3$(CH$_3$)-OCO-C$_6$H$_4$-O(CH$_2$)$_3$-O-Acrylate TABLE 1-continued
Compounds
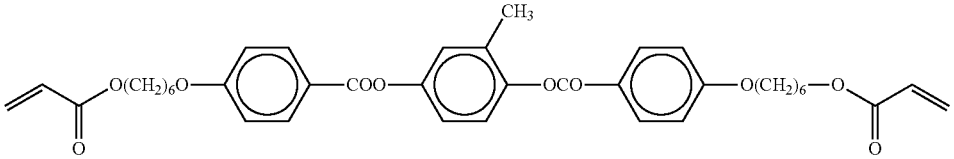 (4)
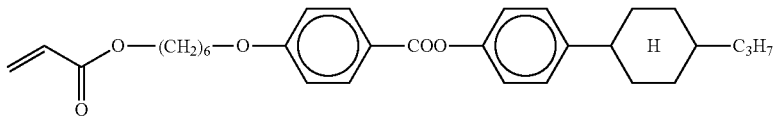 (5)
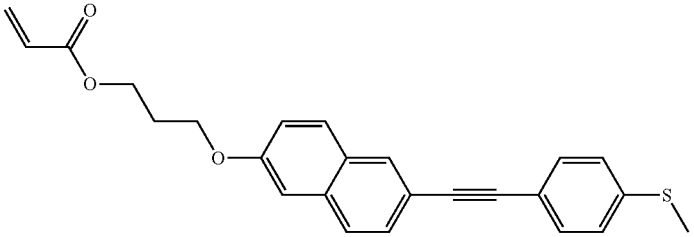 [SMILES: C=CC(=O)OCCCOc1ccc2cc(C#Cc3ccc(SC)cc3)ccc2c1] (6)
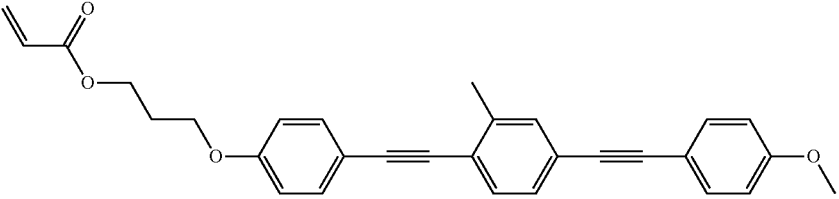 (7)
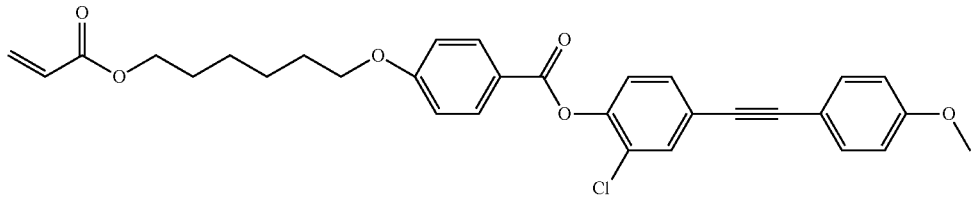 [SMILES: C=CC(=O)OCCCCCCOc1ccc(C(=O)Oc2ccc(C#Cc3ccc(OC)cc3)cc2Cl)cc1] (8)
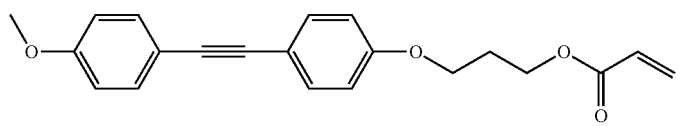 [SMILES: C=CC(=O)OCCCOc1ccc(C#Cc2ccc(OC)cc2)cc1] (9)
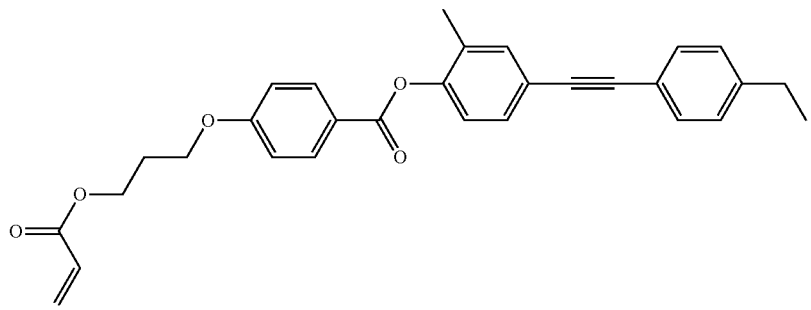 [SMILES: C=CC(=O)OCCCOc1ccc(C(=O)Oc2ccc(C#Cc3ccc(CC)cc3)cc2C)cc1] (10)

TABLE 1-continued

Compounds

(11) [Chemical structure: a diacrylate compound with two acrylate-propoxy groups connected via phenyl-ethynyl-methylphenyl-ethynyl-phenyl core]

TABLE 2

Compositions of examples 1 to 15

| Compound* | Example 1 | Example 2 | Example 3 | Example 4 | Example 5 |
|---|---|---|---|---|---|
| (1) | 19.73 | 19.73 | 19.73 | 19.73 | 19.73 |
| (2) | 15.78 | 15.78 | 15.78 | 15.78 | 15.78 |
| (3) | 23.68 | 23.68 | 23.68 | 23.68 | 23.68 |
| (4) | 11.84 | 11.84 | 11.84 | 11.84 | 11.84 |
| (5) | 7.89 | 7.89 | 7.89 | 7.89 | 7.89 |
| (6) | 20.00 | — | — | — | — |
| (7) | — | 20.00 | — | — | — |
| (8) | — | — | 20.00 | — | — |
| (9) | — | — | — | 20.00 | — |
| (10) | — | — | — | — | 20.00 |
| (11) | — | — | — | — | — |
| Hexandiol diacrylate | — | — | — | — | — |
| Irganox ® 1076 | 0.08 | 0.08 | 0.08 | 0.08 | 0.08 |
| Irgacure ® 651 | 1.00 | 1.00 | 1.00 | 1.00 | 1.00 |
| Total amount | 100.00 | 100.00 | 100.00 | 100.00 | 100.00 |

| Compound* | Example 6 | Example 7 | Example 8 | Example 9 | Example 10 |
|---|---|---|---|---|---|
| (1) | 19.73 | 21.73 | 18.73 | 15.78 | 12.73 |
| (2) | 15.78 | 17.38 | 14.98 | 12.57 | 10.18 |
| (3) | 23.68 | 26.08 | 22.48 | 18.86 | 15.28 |
| (4) | 11.84 | 13.04 | 11.24 | 9.43 | 7.64 |
| (5) | 7.89 | 8.69 | 7.49 | 6.28 | 5.09 |
| (6) | — | — | — | — | — |
| (7) | — | 12.00 | 24.00 | 36.00 | 48.00 |
| (8) | — | — | — | — | — |
| (9) | — | — | — | — | — |
| (10) | — | — | — | — | — |
| (11) | 20.00 | — | — | — | — |
| Hexandiol diacrylate | — | — | — | — | — |
| Irganox ® 1076 | 0.08 | 0.08 | 0.08 | 0.08 | 0.08 |
| Irgacure ® 651 | 1.00 | 1.00 | 1.00 | 1.00 | 1.00 |
| Total amount | 100.00 | 100.00 | 100.00 | 100.00 | 100.00 |

| Compound* | Example 11 | Example 12 | Example 13 | Example 14 | Example 15 |
|---|---|---|---|---|---|
| (1) | 15.78 | 14.92 | 14.12 | 32.00 | 7.00 |
| (2) | 12.57 | 11.93 | 11.30 | 14.92 | 7.00 |
| (3) | 18.86 | 17.91 | 16.95 | 8.00 | 29.92 |
| (4) | 9.43 | 8.95 | 8.47 | 4.00 | 10.00 |
| (5) | 6.28 | 5.97 | 5.65 | — | 5.00 |
| (6) | — | — | — | — | — |
| (7) | 36.00 | 34.25 | 32.43 | — | — |
| (8) | — | — | — | 40.00 | 40.00 |
| (9) | — | — | — | — | — |
| (10) | — | — | — | — | — |
| (11) | — | — | — | — | — |
| Hexandiol diacrylate | — | 5.00 | 10.00 | — | — |
| Irganox ® 1076 | 0.08 | 0.08 | 0.08 | 0.08 | 0.08 |
| Irgacure ® 651 | 1.00 | 1.00 | 1.00 | 1.00 | 1.00 |
| Total amount | 100.00 | 100.00 | 100.00 | 100.00 | 100.00 |

*all given amounts in % w/w

TABLE 3

Experimental conditions of examples 1 to 15

| Example | Mp. [° C.] | Annealing temp. [° C.] | Curing temp. [° C.] | Irradiation dose [mJ] |
|---|---|---|---|---|
| 1) | 89.0 | 86.0 | 20.0 | 3000 |
| 2) | 106.7 | 104.0 | 20.0 | 3000 |
| 3) | 97.7 | 95.0 | 20.0 | 3000 |
| 4) | 76.7 | 74.0 | 20.0 | 3000 |
| 5) | 92.8 | 90.0 | 20.0 | 3000 |
| 6) | 100.3 | 97.0 | 20.0 | 3000 |
| 7) | 97.7 | 80.0 | 20.0 | 3000 |
| 8) | 109.0 | 80.0 | 20.0 | 3000 |
| 9) | 124.9 | 80.0 | 20.0 | 3000 |
| 10) | 137.5 | 80.0 | 20.0 | 3000 |
| 11) | 125.2 | 80.0 | 80.0 | 20 |
| 12) | 112.9 | 80.0 | 80.0 | 20 |
| 13) | 98.2 | 80.0 | 80.0 | 20 |
| 14) | 90.1 | 80.0 | 20.0 | 3000 |
| 15) | 122.1 | 112.0 | 20.0 | 3000 |

TABLE 4

Physical characteristics of examples 1 to 15

| Example | Δn | Mp. [° C.] | b-value | Transmission at 550 nm [%] |
|---|---|---|---|---|
| 1) | 0.235 | 89.0 | 10.0 | 95.4 |
| 2) | 0.220 | 106.7 | 6.4 | 96.1 |
| 3) | 0.219 | 97.7 | 5.4 | 95.4 |
| 4) | 0.210 | 76.7 | 5.7 | 97.1 |
| 5) | 0.214 | 92.8 | 5.0 | 96.6 |
| 6) | 0.226 | 100.3 | 6.8 | 93.4 |
| 7) | 0.212 | 97.7 | 8.8 | 96.9 |

TABLE 4-continued

Physical characteristics of examples 1 to 15

| Example | Δn | Mp. [° C.] | b-value | Transmission at 550 nm [%] |
|---|---|---|---|---|
| 8) | 0.254 | 109.0 | 9.5 | 95.4 |
| 9) | 0.294 | 124.9 | 9.8 | 96.0 |
| 10) | 0.338 | 137.5 | 10.2 | 93.4 |
| 11) | 0.310 | 125.2 | 9.0 | — |
| 12) | 0.274 | 112.9 | 9.4 | 94.3 |
| 13) | 0.260 | 98.2 | 9.5 | 93.6 |
| 14) | 0.240 | 90.1 | 6.6 | — |
| 15) | 0.240 | 122.1 | 6.5 | — |

As can be seen from table 4, all examples show high values for the birefringence, low values for the yellowness index and high values for the transmission. Moreover, all examples show an homogeneous planar alignment, which can be confirmed by dark state testing between crossed polarizers.

Comparative Examples

Comparative test cells, are prepared from polymerizable liquid-crystalline media summarized in table 2, comprising the given amounts of the compounds summarized in table 5, by melting the medium, flow filling the medium into a rubbed polyimide glass cell having a thickness of 20 μm, annealing the medium at the given temperature for 3 min, and curing the medium using UV light (250 nm-450 nm bandpass filter) with the specified irradiation dose at the given temperature.

The experimental conditions such as melting points, annealing temperatures, curing temperatures and the irradiation doses are summarized in table 6 whereas the physical characteristics, such as the resulting Δn, the corresponding transmission, and b-value for each example are summarized in table 7.

TABLE 5

Compositions of Comparative examples 1 to 3

| Compound* | Comparative Example 1 | Comparative Example 2 | Comparative Example 3 |
|---|---|---|---|
| (1) | 9.73 | 13.33 | 12.53 |
| (2) | 7.78 | 10.66 | 10.03 |
| (3) | 11.68 | 16.00 | 15.05 |
| (4) | 5.84 | 8.00 | 7.52 |
| (5) | 3.89 | 5.33 | 5.01 |
| (6) | — | — | — |
| (7) | 60.00 | 30.60 | 28.78 |
| (8) | — | — | — |
| (9) | — | — | — |
| (10) | — | — | — |
| (11) | — | — | — |
| Hexandiol diacrylate | — | 15.00 | 20.00 |
| Irganox ® 1076 | 0.08 | 0.08 | 0.08 |
| Irgacure ® 651 | 1.00 | 1.00 | 1.00 |
| Total amount | 100.00 | 100.00 | 100.00 |

TABLE 6

Experimental conditions of comparative examples 1 to 3

| Comparative Example | Mp. [° C.] | Annealing temp. [° C.] | Curing temp. [° C.] | Irradiation dose [mJ] |
|---|---|---|---|---|
| 1) | 89.0 | 80.0 | 20.0 | 3000 |
| 2) | 77.8 | 80.0 | 80.0 | 20 |
| 3) | 53.6 | 80.0 | 80.0 | 20 |

TABLE 7

Physical characteristics of comparative examples 1 to 3

| Comparative Example | Δn | Mp. [° C.] | b-value | Transmission at 550 nm [%] |
|---|---|---|---|---|
| 1) | — | 89.0 | — | — |
| 2) | 0.241 | 77.8 | 9.7 | 92.1 |
| 3) | 0.221 | 53.6 | 11.1 | 75.8 |

As can be seen from table 7, the comparative examples 2 and 3 show clearly lower values for the transmission at 550 nm than all working examples. Moreover, comparative example 1 shows a poor room temperature stability against crystallization before polymerization of at most 2 minutes. Furthermore, all examples cannot be homogeneously aligned.

The invention claimed is:

1. A birefringent RM lens obtainable from a polymerizable liquid crystalline medium consisting of:
a polymerizable liquid crystalline component (A) comprising at least one polymerizable mesogenic compound of formula I, $$P\text{-}Sp\text{-}(A^1\text{-}Z^1)_{m1}\text{-}A^2\text{-}C{\equiv}C\text{-}A^3\text{-}(Z^1\text{-}A^1)_{m2}\text{-}R \qquad I$$

wherein
P is a polymerizable group,
Sp is a spacer group or a single bond,
$A^1$ is, in case of multiple occurrence independently of one another, selected from carbocylic, heterocyclic, aromatic or heteroaromatic groups, which are optionally substituted by one or more groups L,
$A^2$ and $A^3$ are independently of each other selected from 1,4-phenylene or naphthalene-2,6-diyl, wherein one or more CH groups may be replaced by N, and which are optionally substituted by one or more groups L,
$Z^1$ is in case of multiple occurrence independently of one another selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH═CH—, —CY$^1$═CY$^2$—, —CH═N—, —N═CH—, —N═N—, —CH═CR$^0$—, —C≡C—, —CH═CH—COO—, —OCO—CH═CH—, CR$^0$R$^{00}$ or a single bond,
L is in case of multiple occurrence independently of one another selected from P-Sp-, F, Cl, Br, I, —CN, —NO$_2$, —NCO, —NCS, —OCN, —SCN, —C(═O)NR$^0$R$^{00}$, —C(═O)X, —C(═O)OR$^0$, —C(═O)R$^0$, —NR$^0$R$^{00}$, —OH, —SF$_5$, optionally substituted silyl, aryl or heteroaryl with 1 to 12, and straight chain or branched alkyl, alkoxy, alkylcarbonyl, alkoxycarbonyl, alkylcarbonyloxy or alkoxycarbonyloxy with 1 to 12, wherein one or more H atoms are optionally replaced by F or Cl, wherein X is halogen, R is H, alkyl, alkoxy, thioalkyl, alkylcarbonyl, alkoxycarbonyl, alkylcarbonyloxy or alkoxycarbonyloxy with 1 to 20 C atoms more, which are optionally fluorinated, or is $Y^0$ or P-Sp-, $Y^0$ is F, Cl, CN, $NO_2$, $OCH_3$, OCN, SCN, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, preferably F, Cl, CN, $NO_2$, $OCH_3$, or mono- oligo- or polyfluorinated alkyl or alkoxy with 1 to 4 C atoms, $Y^1$ and $Y^2$ independently of each other denote H, F, Cl or CN, $R^0$ and $R^{00}$ are independently of each other H or alkyl with 1 to 12 C-atoms, m1 and m2 are independently of each other 0, 1, 2, 3 or 4, wherein when m1 and m2 are 0, one or both of $A^2$ and $A^3$ denote 1,4-phenylene that is at least monosubstituted by L, or optionally substituted naphthalene-2,6-diyl, and at most 5% by weight of the total medium of a non-mesogenic component (B)

and wherein said liquid crystalline medium comprises 10 to 40% by weight of the total medium of one or more compounds of formula I and wherein said RM lens has a birefringence (Δn) in the range from 0.19 to 0.50, a yellowness index (b-value) lower than 12 and a transmission at 550 nm is higher than 85%.

2. The birefringent RM lens according to claim 1, wherein component component (A) comprises at least one a compound of formula I, which is selected from the group consisting of compounds of formulae Ia to Ip,

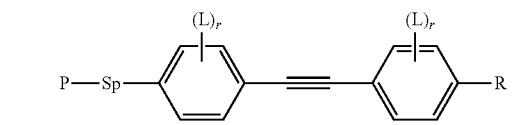

Ia

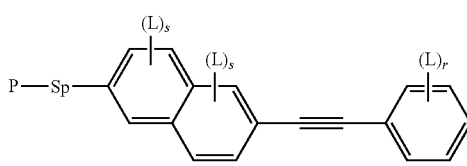

Ib

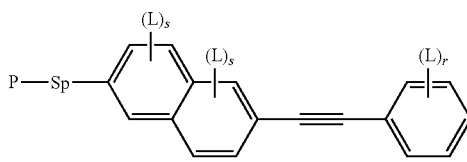

Ic

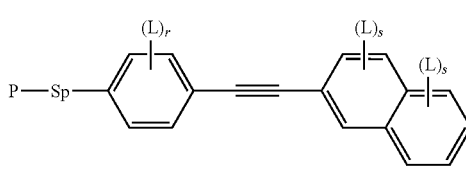

Id

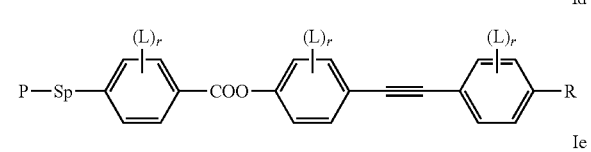

Ie

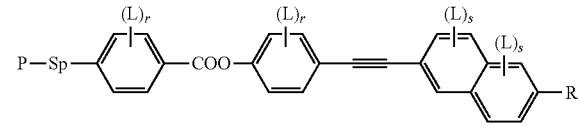

If

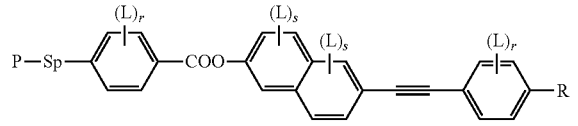

Ig

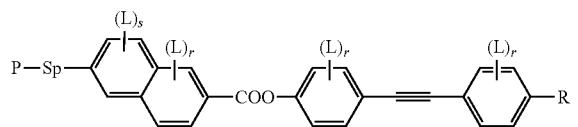

Ih

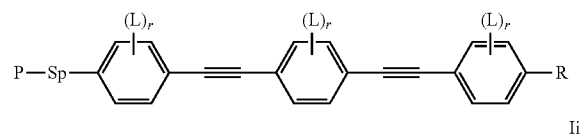

Ii

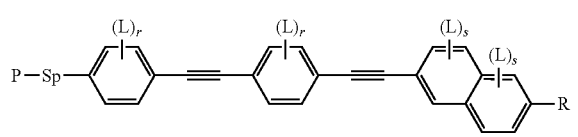

Ik

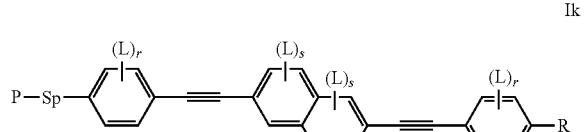

Im

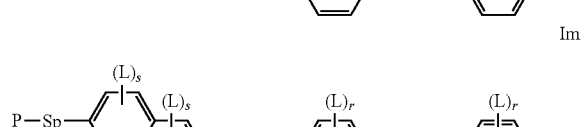

In

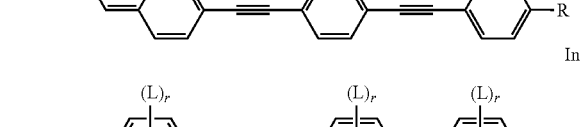

Io

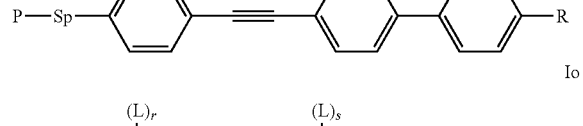

Ip

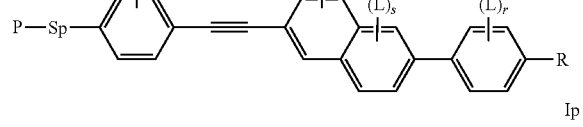

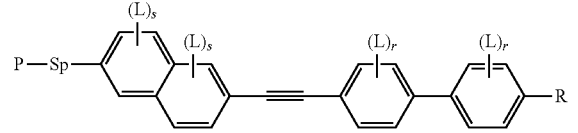

wherein

P, Sp, L and R have one the meanings given above, r is, 1, 2, 3 or 4, and s is, 1, 2 or 3.

3. The birefringent RM lens according to claim 1, wherein the non-mesogenic component (B) comprises one or more mono-, di- or multireactive polymerizable non-mesogenic compounds, catalysts, sensitizers, stabilizers, polymerization initiators, inhibitors, chain-transfer agents, lubricating agents, wetting agents, dispersing agents, hydrophobing agents, adhesive agents, flow improvers, defoaming agents, deaerators, diluents, reactive diluents, auxiliaries, colourants or pigments.

4. The birefringent RM lens according to claim 1, wherein the non-mesogenic component B comprises at least one monoreactive di- or multireactive polymerizable non-mesogenic compound in an amount of not more than 5% by weight of the total medium.

5. The birefringent RM lens according to claim 1, wherein the amount of the polymerizable liquid-crystalline component A in the medium is more than 88% by weight of the total medium.

6. The birefringent RM lens according to claim 1, wherein the uncured polymerizable liquid crystalline medium exhibits a room temperature stability against crystallization for at least 1 hour.

7. The birefringent RM lens according to claim 1, wherein the birefringence ($\Delta$n) of the RM lens is in the range from 0.21 to 0.40.

8. A method of production of a birefringent RM lens according to claim 1, comprising the steps of
providing a layer of a melt of the polymerizable liquid crystalline medium onto a substrate at elevated temperature,
providing an inverse lens mould on top of the coated polymerizable liquid crystalline medium,
annealing the polymerizable liquid crystalline medium in the mould at elevated temperature,
cooling the mould,
curing of the polymerizable liquid crystalline medium, optionally removing the mould.

9. A method which comprises adding a birefringent RM lens according to claim 1, to an electro optical device.

10. An electro optical device comprising at least one birefringent RM lens according to claim 1.

11. A birefringent RM lens obtainable from a polymerizable liquid crystalline medium consisting of:
a polymerizable liquid crystalline component (A) comprising at least one polymerizable mesogenic compound of formula I,

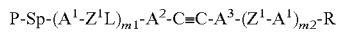

P-Sp-$(A^1$-$Z^1$L$)_{m1}$-$A^2$-C≡C-$A^3$-$(Z^1$-$A^1)_{m2}$-R     I wherein
P is a polymerizable group,
Sp is a spacer group or a single bond,
$A^1$ is, in case of multiple occurrence independently of one another, selected from carbocyclic, heterocyclic, aromatic or heteroaromatic groups, which are optionally substituted by one or more groups L,
$A^2$ and $A^3$ are independently of each other selected from 1,4-phenylene or naphthalene-2,6-diyl, wherein one or more CH groups may be replaced by N, and which are optionally substituted by one or more groups L,
$Z^1$ is in case of multiple occurrence independently of one another selected from —O—, —S—, —CO—, —COO—, —OCO—, —O—COO—, —CO—NR°—, —NR°—CO—, —NR°—CO—NR°—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH═CH—, —CY$^1$═CY$^2$—, —CH═N—, —N═CH—, —N═N—, —CH═CR°—, —C≡C—, —CH═CH—COO—, —OCO—CH═CH—, CR°R°° or a single bond,
L is in case of multiple occurrence independently of one another selected from P-Sp-, F, Cl, Br, I, —CN, —NO$_2$, —NCO, —NCS, —OCN, —SCN, —C(═O)NR°R°°, —C(═O)X, —C(═O)OR°, —C(═O)R°, —NR°R°°, —OH, —SF$_5$, optionally substituted silyl, aryl or heteroaryl with 1 to 12, and straight chain or branched alkyl, alkoxy, alkylcarbonyl, alkoxycarbonyl, alkylcarbonyloxy or alkoxycarbonyloxy with 1 to 12, wherein one or more H atoms are optionally replaced by F or Cl, wherein X is halogen,
R is H, alkyl, alkoxy, thioalkyl, alkylcarbonyl, alkoxycarbonyl, alkylcarbonyloxy or alkoxycarbonyloxy with 1 to 20 C atoms more, which are optionally fluorinated, or is Y° or P-Sp-,
Y° is F, Cl, CN, NO$_2$, OCH$_3$, OCN, SCN, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, preferably F, Cl, CN, NO$_2$, OCH$_3$, or mono- oligo- or polyfluorinated alkyl or alkoxy with 1 to 4 C atoms,
$Y^1$ and Y independently of each other denote H, F, Cl or CN,
R° and R°° are independently of each other H or alkyl with 1 to 12 C-atoms,
m1 and m2 are independently of each other 0, 1, 2, 3 or 4,
wherein when m1 and m2 are 0, one or both of $A^2$ and $A^3$ denote 1,4-phenylene that is at least monosubstituted by L, or optionally substituted naphthalene-2,6-diyl, and
at most 5% by weight of the total medium of a non-mesogenic component (B)
and wherein said liquid crystalline medium comprises 10 to 40% by weight of the total medium of one or more compounds of formula I
and wherein said RM lens has a birefringence (Δn) in the range from 0.19 to 0.50.

12. A birefringent RM lens according to claim 11, wherein the birefringence (Δn) of the RM lens is in the range from 0.20 to 0.45.

13. A birefringent RM lens according to claim 11, wherein the birefringence (Δn) of the RM lens is in the range from 0.21 to 0.40.

14. A birefringent RM lens according to claim 1, wherein the yellowness index (b-value) is lower than 12 and the transmission at 550 nm is higher than 90%.

15. A birefringent RM lens according to claim 14, wherein the yellowness index (b-value) is lower than 10 and the transmission at 550 nm is higher than 93%.

* * * * *